(12) United States Patent
Liu

(10) Patent No.: US 12,531,659 B2
(45) Date of Patent: Jan. 20, 2026

(54) METHOD AND DEVICE IN NODES USED FOR WIRELESS COMMUNICATION

(71) Applicant: Zheng Liu, Shanghai (CN)

(72) Inventor: Zheng Liu, Shanghai (CN)

(73) Assignee: SHANGHAI TUILUO COMMUNICATION TECHNOLOGY PARTNERSHIP (LIMITED PARTNERSHIP), Shanghai (CN)

( * ) Notice: Subject to any disclaimer, the term of this patent is extended or adjusted under 35 U.S.C. 154(b) by 580 days.

(21) Appl. No.: 17/975,618

(22) Filed: Oct. 28, 2022

(65) Prior Publication Data

US 2023/0137740 A1   May 4, 2023

(30) Foreign Application Priority Data

Oct. 29, 2021  (CN) .......................... 202111273001.X

(51) Int. Cl.
*H04L 1/18*        (2023.01)
*H04L 1/1812*      (2023.01)

(52) U.S. Cl.
CPC .................................. *H04L 1/1812* (2013.01)

(58) Field of Classification Search
CPC ................. H04W 28/04; H04W 72/04; H04W 72/042; H04W 88/08; H04L 5/0007; H04L 1/1812

(Continued)

(56) References Cited

U.S. PATENT DOCUMENTS

| 11,665,704 B2 * | 5/2023 | Park ..................... H04L 27/2607 |
| | | 370/329 |
| 2013/0016687 A1 * | 1/2013 | Yang ..................... H04L 5/0053 |
| | | 370/329 |

(Continued)

FOREIGN PATENT DOCUMENTS

| CN | 112152762 A | * 12/2020 | ........... H04L 1/1812 |
| CN | 113489576 A | * 10/2021 | .......... H04W 72/563 |

(Continued)

OTHER PUBLICATIONS

3GPP tsg ran\WG1 RL1 vivo,"R1-1803832 Remaining issues on PUCCH with short-duration" Apr. 6, 2018.

(Continued)

*Primary Examiner* — Asad M Nawaz
*Assistant Examiner* — Sanjay K Dewan

(57) ABSTRACT

Discloses a method and a device in a node for wireless communications. The node receives a first information block, the first information block being used to determine a first offset value; and determines a first bit block and transmits a target PUSCH, where a target bit sequence is used for generating the target PUSCH, and the first bit block is used for generating a first bit sequence, the first bit sequence belonging to the target bit sequence, and the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block. The present application can enhance the resource utilization ratio of HARQ multiplexing.

20 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0036604 A1* | 2/2015 | Park ...................... | H04L 5/0048 370/329 |
| 2023/0095899 A1* | 3/2023 | Yang ..................... | H04L 1/1861 370/329 |
| 2023/0143581 A1* | 5/2023 | Myung ............. | H04W 72/1268 370/329 |
| 2023/0155739 A1* | 5/2023 | Yang ........................ | H04L 5/00 370/329 |
| 2023/0283415 A1* | 9/2023 | Blankenship ......... | H04L 1/1854 370/329 |
| 2023/0284227 A1* | 9/2023 | Choi ..................... | H04L 1/1854 370/329 |

FOREIGN PATENT DOCUMENTS

| | | | | |
|---|---|---|---|---|
| CN | 113544992 A | * | 10/2021 | ........... H04L 5/0055 |
| WO | WO 2019/217529 A1 | * | 11/2019 | ............ H04W 72/04 |
| WO | WO 2021129250 A1 | * | 7/2021 | ......... H04L 27/2605 |

OTHER PUBLICATIONS

3GPP tsg ran\wg1_rl1 Apple Inc., "R1-2110416 Rel-17 URLLC UCI multiplexing design v3update" Oct. 13, 2021.
Official Action of the CN202111273001.X, dated Mar. 28, 2025.
First Search report of the CN202111273001.X, dated Mar. 25, 2025.

* cited by examiner

METHOD AND DEVICE IN NODES USED FOR WIRELESS COMMUNICATION

CROSS REFERENCE TO RELATED APPLICATIONS

This application claims the priority benefit of Chinese Patent Application No. 202111273001.X, filed on Oct. 29, 2021, the full disclosure of which is incorporated herein by reference.

BACKGROUND

Technical Field

The present application relates to transmission methods and devices in wireless communication systems, and in particular to a scheme and device for transmitting information of different priorities in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR. A decision was made at the 3GPP RAN #86 Plenary on starting a Study Item (SI) and Work Item (WI) of NR Rel-17.

Enhanced Mobile BroadBand (eMBB), Ultra-reliable and Low Latency Communications (URLLC) and massive Machine Type Communications (mMTC) are three major application scenarios in New Radio (NR) technology.

SUMMARY

In URLLC, there are high-priority and low-priority data or control information being transmitted. In NR Rel-16, when different priorities of Uplink Control Information (UCI) collide in time domain, the UCI of low priority will be dropped to ensure the transmission of high-priority UCI. In NR-Rel-17, different priorities of Uplink Control Information (UCI) are supported to be multiplexed onto a same PUCCH or a same PUSCH.

To address the issue of multiplexing UCIs associated with different priorities, the present application provides a solution. It should be noted that the statement in the present application only takes URLLC as a typical application scenario or example; the present application is also applicable to other scenarios confronting similar issues, for instance, scenarios where various services coexist, or other scenarios where information of high priority and information of low priority are multiplexed, or scenarios where services having different QoS requirements are multiplexed, or diverse application scenarios such as V2X and eMBB multiplexing, where similar technical effects can be achieved. Additionally, the adoption of a unified solution for various scenarios, including but not limited to URLLC scenario, contributes to the reduction of hardcore complexity and costs. In the case of no conflict, the embodiments of a first node and the characteristics in the embodiments may be applied to a second node, and vice versa. Particularly, for interpretations of the terminology, nouns, functions and variants (unless otherwise specified) in the present application, refer to definitions given in TS36 series, TS38 series and TS37 series of 3GPP specifications.

The present application provides a method in a first node for wireless communications, comprising:
receiving a first information block, the first information block being used to determine a first offset value, the first offset value being a non-negative number; and
determining a first bit block and transmitting a target PUSCH, where a target bit sequence is used for generating the target PUSCH, the target bit sequence comprising multiple sequentially indexed bits;
herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, by determining a target condition according to the number of priority/priorities corresponding to HARQ-ACK(s) carried by a target PUSCH, it is possible to design varying conditions or methods for occupying Reserved REs based on the multiplexing of high-priority and low-priority HARQ-ACKs, which not only avoids potential waste of reserved REs but also ensures that the utilization ratio of resources multiplexed on the PUSCH is controlled.

According to one aspect of the present application, the above method is characterized in that when the number of priority/priorities corresponding to HARQ-ACK(s) that the target PUSCH is used to carry is no greater than 1, the target condition is a first condition; when the number of priorities corresponding to HARQ-ACKs that the target PUSCH is used to carry is equal to 2, the target condition is a second condition; the first condition is one of the X1 candidate conditions, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

In one embodiment, when occupying reserved REs it would be better reuse the existing channel encoder so as to ensure that the reserved REs are not wasted and the complexity of implementation is reduced in all cases of multiplexing.

According to one aspect of the present application, the above method is characterized in that the first information block is used to determine a second offset value, and the target PUSCH is used for carrying a second bit block, the second bit block comprising at least one HARQ-ACK bit;

the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value is used together with a first reference numerical value to determine a number of RE(s) comprised in the first time-frequency resource block; a number of bits comprised in the first reference bit block (bit size of the first reference bit block) is equal to the first reference numerical value; when the number of HARQ-ACK bit(s) comprised in the first bit block is no greater than 2, any RE mapped by a modulation symbol generated by the second bit sequence is orthogonal with the first time-frequency resource block.

In one embodiment, different β offset values are applied in different cases to determine the number of reserved REs, so that the use of time-frequency resources can be optimized to the greatest extent while reducing the negative impact caused by ambiguous number of HARQ-ACK bit(s), thereby further increasing the resource utilization ratio on PUSCH.

According to one aspect of the present application, the above method is characterized in that when the number of HARQ-ACK bit(s) comprised in the second bit block is no greater than 2, the second bit block is used for generating a second reference bit block, the second reference bit block comprising multiple bits, a number of bits comprised in the second reference bit block (bit size of the second reference bit block) is equal to a second reference numerical value, the second reference numerical value being greater than 2, and the second offset value is used together with the second reference numerical value to determine a number of bits comprised in the second bit sequence; when the number of HARQ-ACK bits comprised in the second bit block is greater than 2, the second offset value is used together with the number of HARQ-ACK bits comprised in the second bit block to determine the number of bits comprised in the second bit sequence.

In one embodiment, when high-priority and low-priority HARQ-ACKs are multiplexed on a PUSCH, the length of an output bit sequence after rate matching is calculated according to a number of padded low-priority HARQ-ACK bit(s), and meanwhile RE mapping of the existing CSI part 1 will be reused, such that the complexity of implementation can be reduced and rate matching is more compatible with RE mapping, and furthermore, the impact of ambiguity in the number of low-priority HARQ-ACK bit(s) can be reduced.

According to one aspect of the present application, the above method is characterized in comprising:
  receiving a first signaling;
  herein, the first signaling is used to determine time-frequency resources occupied by the target PUSCH; at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to determine a first offset value set out of the Y1 offset value sets, and the first offset value is equal to a candidate offset value comprised in the first offset value set, the number of HARQ-ACK bit(s) comprised in the first bit block being used to determine the first offset value from the first offset value set.

In one embodiment, different β offset value sets are used according to whether HARQ-ACKs of different priorities are multiplexed and the number of bits of HARQ-ACKs to be multiplexed, thus the effective code rate of configured UCI can satisfy the requirement for robustness in different cases, and the transmission performance of HARQ-ACK in URLLC can be guaranteed.

According to one aspect of the present application, the above method is characterized in that a scheduling signaling of the target PUSCH comprises a first field, where a value of the first field is a non-negative integer; when a number of priorities corresponding to HARQ-ACK bits that the target PUSCH is used to carry is greater than 1, the value of the first field is used to determine a number of HARQ-ACK bit(s) corresponding to low priority that the target PUSCH is used to carry.

According to one aspect of the present application, the above method is characterized in that the number of HARQ-ACK bit(s) comprised in the first bit block is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence.

The present application provides a method in a second node for wireless communications, comprising:
  transmitting a first information block, the first information block being used to indicate a first offset value, the first offset value being a non-negative number; and
  receiving a target PUSCH and determining a first bit block, where a target bit sequence is used for generating the target PUSCH, the target bit sequence comprising multiple sequentially indexed bits;
  herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

According to one aspect of the present application, the above method is characterized in that when the number of priority/priorities corresponding to HARQ-ACK(s) that the target PUSCH is used to carry is no greater than 1, the target condition is a first condition; when the number of priorities corresponding to HARQ-ACKs that the target PUSCH is used to carry is equal to 2, the target condition is a second condition; the first condition is one of the X1 candidate conditions, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

According to one aspect of the present application, the above method is characterized in that the first information block is used to indicate a second offset value, and the target PUSCH is used for carrying a second bit block, the second bit block comprising at least one HARQ-ACK bit; the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value is used together with a first reference numerical value to determine a number of RE(s) comprised in the first time-frequency resource block; a number of bits comprised in the first reference bit block (bit size of the first reference bit block) is equal to the first reference numerical value; when the number of HARQ-ACK bit(s) comprised in the first bit block is no greater than 2, any RE mapped by a modulation symbol generated by the second bit sequence is orthogonal with the first time-frequency resource block.

According to one aspect of the present application, the above method is characterized in that when the number of HARQ-ACK bit(s) comprised in the second bit block is no greater than 2, the second bit block is used for generating a second reference bit block, the second reference bit block comprising multiple bits, a number of bits comprised in the second reference bit block (bit size of the second reference bit block) is equal to a second reference numerical value, the second reference numerical value being greater than 2, and the second offset value is used together with the second reference numerical value to determine a number of bits comprised in the second bit sequence; when the number of HARQ-ACK bits comprised in the second bit block is greater than 2, the second offset value is used together with the number of HARQ-ACK bits comprised in the second bit block to determine the number of bits comprised in the second bit sequence.

According to one aspect of the present application, the above method is characterized in comprising:
transmitting a first signaling;
herein, the first signaling is used to indicate time-frequency resources occupied by the target PUSCH; at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to indicate a first offset value set out of the Y1 offset value sets, and the first offset value is equal to a candidate offset value comprised in the first offset value set, the number of HARQ-ACK bit(s) comprised in the first bit block being used to determine the first offset value from the first offset value set.

According to one aspect of the present application, the above method is characterized in that a scheduling signaling of the target PUSCH comprises a first field, where a value of the first field is a non-negative integer; when a number of priorities corresponding to HARQ-ACK bits that the target PUSCH is used to carry is greater than 1, the value of the first field is used to indicate a number of HARQ-ACK bit(s) corresponding to low priority that the target PUSCH is used to carry.

According to one aspect of the present application, the above method is characterized in that the number of HARQ-ACK bit(s) comprised in the first bit block is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence.

The present application provides a first node for wireless communications, comprising:
a first receiver, receiving a first information block, the first information block being used to determine a first offset value, the first offset value being a non-negative number; and
a first transmitter, determining a first bit block and transmitting a target PUSCH, where a target bit sequence is used for generating the target PUSCH, the target bit sequence comprising multiple sequentially indexed bits;
herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

The present application provides a second node for wireless communications, comprising:
a second transmitter, transmitting a first information block, the first information block being used to indicate a first offset value, the first offset value being a non-negative number; and
a second receiver, receiving a target PUSCH and determining a first bit block, where a target bit sequence is used for generating the target PUSCH, the target bit sequence comprising multiple sequentially indexed bits;
herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, the method in the present application has the following advantages:

- the method provided in the present application makes it possible to design varying conditions or methods for occupying Reserved REs based on the multiplexing of high-priority and low-priority HARQ-ACKs, which not only avoids potential waste of reserved REs but also ensures that the utilization ratio of resources multiplexed on the PUSCH is controlled.
- the method provided in the present application tries to reuse the existing channel encoder as often as possible when occupying reserved REs, so as to ensure that the reserved REs are not wasted and the complexity of implementation is reduced in all cases of multiplexing.
- the method provided in the present application uses different β offset values for different cases to determine the number of reserved REs, so that the use of time-frequency resources can be optimized to the greatest extent while reducing the negative impact caused by ambiguous number of HARQ-ACK bit(s), thereby further increasing the resource utilization ratio on PUSCH.
- with the method in the present application, when high-priority and low-priority HARQ-ACKs are multiplexed on a PUSCH, the length of an output bit sequence after rate matching is calculated according to a number of padded low-priority HARQ-ACK bit(s), and meanwhile RE mapping of the existing CSI part 1 will be reused, such that the complexity of implementation can be reduced and rate matching is more compatible with RE mapping, and furthermore, the impact of ambiguity in the number of low-priority HARQ-ACK bit(s) can be reduced.
- the method in the present application uses different β offset value sets according to whether HARQ-ACKs of different priorities are multiplexed and the number of bits of HARQ-ACKs to be multiplexed, thus the effective code rate of configured UCI can satisfy the requirement for robustness in different cases, and the transmission performance of HARQ-ACK in URLLC can be guaranteed.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
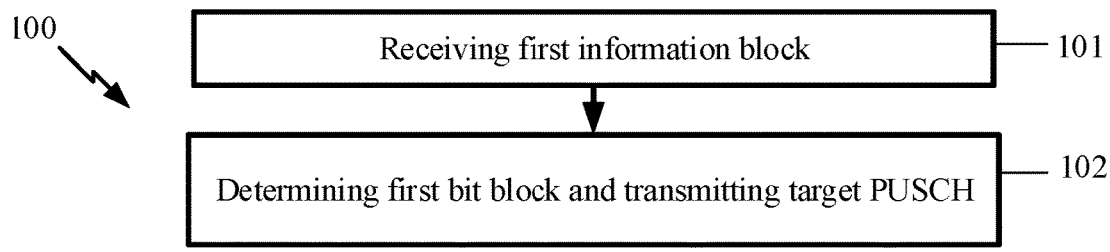
FIG. 1 illustrates a flowchart of a first information block and a target PUSCH according to one embodiment of the present application.

Embodiment 1 illustrates a flowchart 100 of a first information block and a target PUSCH according to one embodiment of the present application, as shown in FIG. 1. In FIG. 1, each step represents a step, it should be particularly noted that the sequence order of each box herein only indicates an exemplary order of how each step marked respectively by these boxes is arranged rather than restrict the chronological order of those steps.

In Embodiment 1, the first node in the present application receives a first information block in step 101, the first information block being used to determine a first offset value, the first offset value being a non-negative number; the first node in the present application determines a first bit block and transmits a target PUSCH, where a target bit sequence is used for generating the target PUSCH, the target bit sequence comprising multiple sequentially indexed bits; herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, the first information block is transmitted via an air interface or a wireless interface.

In one embodiment, the first information block comprises all or part of a higher layer signaling or a physical layer signaling.

In one embodiment, the first information block comprises all or part of a Radio Resource Control (RRC) layer signaling or a Medium Access Control (MAC) layer signaling.

In one embodiment, the first information block is Cell Specific or UE-specific.

In one embodiment, the first information block is Per Bandwidth-Part (BWP) Configured.

In one embodiment, the first information block comprises all or partial fields in a Downlink Control Information (DCI) Format.

In one embodiment, the first information block comprises a field "beta_offset indicator" in a Downlink Control Information (DCI) Format.

In one embodiment, the first information block comprises a field "Cross Priority beta_offset indicator" in a Downlink Control Information (DCI) Format.

In one embodiment, the first information block comprises one or more fields in a scheduling DCI format of the target PUSCH.

In one embodiment, the first information block comprises one or more fields in a DCI format scheduling the target PUSCH.

In one embodiment, the first information block comprises more than one sub-information block, and each sub-information block comprised in the first information block is an Information Element (IE) or a field in an RRC signaling to which the first information belongs; one or more of the sub-information blocks comprised in the first information block is/are used to determine the first offset value.

In one embodiment, the first information block comprises all or partial fields in an Information Element (IE) "PUSCH-Config".

In one embodiment, the first information block comprises all or partial fields in an Information Element (IE) "UCI-OnPUSCH".

In one embodiment, the first information block comprises all or partial fields in an Information Element (IE) "UCI-OnPUSCH-r17".

In one embodiment, the first information block comprises all or partial fields comprised in an Information Element (IE) "BetaOffsets".

In one embodiment, the first information block comprises all or partial fields comprised in an Information Element (IE) "betaOffsetsCrossPri-r17".

In one embodiment, the first information block comprises all or partial fields comprised in an Information Element (IE) "betaOffsetsCrossPri-List-r17".

In one embodiment, the first information block comprises all or partial fields comprised in an Information Element (IE) "betaOffsetsCrossPri-DCI-0-1-r17".

In one embodiment, the first information block comprises all or partial fields comprised in an Information Element (IE) "betaOffsetsCrossPri-List DCI-0-1-r17".

In one embodiment, the first information block comprises all or partial fields comprised in an Information Element (IE) "betaOffsetsCrossPri-DCI-0-2-r17".

In one embodiment, the first information block comprises all or partial fields comprised in an Information Element (IE) "betaOffsetsCrossPri-List DCI-0-2-r17".

In one embodiment, the first information block comprises all or partial fields in an Information Element (IE) "UCI-OnPUSCH-DCI-0-2-r17".

In one embodiment, the first information block comprises all or partial fields in an Information Element (IE) "UCI-OnPUSCH-DCI-0-1-r17".

In one embodiment, the first information block comprises all or partial fields in an Information Element (IE) "UCI-OnPUSCH-ListDCI-0-2-r17".

In one embodiment, the first information block comprises all or partial fields in an Information Element (IE) "UCI-OnPUSCH-ListDCI-0-1-r17".

In one embodiment, the first information block comprises all or partial fields in an Information Element (IE) "UCI-OnPUSCH-List-r17".

In one embodiment, the statement of "the first information block being used to determine a first offset value" in the claims includes a meaning that: the first information block is used by the first node in the present application to determine the first offset value.

In one embodiment, the statement of "the first information block being used to determine a first offset value" in the claims includes a meaning that: the first information block is used for explicitly or implicitly indicating the first offset value.

In one embodiment, the statement of "the first information block being used to determine a first offset value" in the claims includes a meaning that: the first information block is used for explicitly or implicitly indicating an index of the first offset value.

In one embodiment, the statement of "the first information block being used to determine a first offset value" in the claims includes a meaning that: the first information block is used for explicitly or implicitly indicating an offset value index combination including an index of the first offset value, the offset value index combination comprising indexes of β offset values of Uplink Control Information (UCI) of different types or having different ranges of numbers of information bits.

In one embodiment, the statement of "the first information block being used to determine a first offset value" in the claims includes a meaning that: the first information block is used for explicitly or implicitly determining multiple offset value index combinations, the multiple offset value index combinations including an offset value index combination to which an index of the first offset value belongs, any of the multiple offset value index combinations comprises indexes of β offset values of Uplink Control Information (UCI) of different types or having different ranges of numbers of information bits.

In one embodiment, the statement of "the first information block being used to determine a first offset value" in the claims includes a meaning that: the first information block is used for explicitly or implicitly indicating an offset value index combination including an index of the first offset value, the offset value index combination comprising indexes of β offset values of Uplink Control Information (UCI) of different types or using different types of channel encoders.

In one embodiment, the statement of "the first information block being used to determine a first offset value" in the claims includes a meaning that: the first information block is used for explicitly or implicitly determining multiple offset value index combinations, the multiple offset value index combinations including an offset value index combination to which an index of the first offset value belongs, any of the multiple offset value index combinations comprises indexes of β offset values of Uplink Control Information (UCI) of different types or using different types of channel encoders.

In one embodiment, the statement of "the first information block being used to determine a first offset value" in the claims includes a meaning that: the first information block is used for explicitly or implicitly determining multiple offset values including the first offset value.

In one embodiment, the statement of "the first information block being used to determine a first offset value" in the claims includes a meaning that: the first information block is used for explicitly or implicitly determining an offset value set including the first offset value.

In one embodiment, the statement of "the first information block being used to determine a first offset value" in the claims includes a meaning that: the first information block is used for explicitly or implicitly determining an offset value list including the first offset value.

In one embodiment, the statement of "the first information block being used to determine a first offset value" in the claims includes a meaning that: the first information block is used for explicitly or implicitly determining multiple offset value sets, where one of the multiple offset value sets comprises the first offset value.

In one embodiment, the statement of "the first information block being used to determine a first offset value" in the claims includes a meaning that: the first information block is used for explicitly or implicitly determining the Y1 offset value sets in the present application.

In one embodiment, the statement of "the first information block being used to determine a first offset value" in the claims includes a meaning that: the first information block is used for explicitly or implicitly determining multiple offset value sets among the Y1 offset value sets in the present application.

In one embodiment, the first offset value is a β offset value (i.e., Beta Offset).

In one embodiment, the first offset value is a β offset value (i.e., Beta Offset) of a HARQ-ACK no greater than 2 bits.

In one embodiment, the first offset value is a β offset value (i.e., Beta Offset) of a HARQ-ACK greater than 2 bits and no greater than 11 bits.

In one embodiment, the first offset value is a β offset value (i.e., Beta Offset) of a HARQ-ACK greater than 11 bits.

In one embodiment, the first offset value is a β offset value (i.e., Beta Offset) of a HARQ-ACK of high priority.

In one embodiment, the first offset value is a β offset value (i.e., Beta Offset) of a HARQ-ACK of low priority.

In one embodiment, the first offset value is a β offset value (i.e., Beta Offset) of a HARQ-ACK of high priority carried by a low-priority PUSCH.

In one embodiment, the first offset value is a β offset value (i.e., Beta Offset) of a HARQ-ACK of high priority carried by a high-priority PUSCH.

In one embodiment, the first offset value is a β offset value (i.e., Beta Offset) of a HARQ-ACK of low priority carried by a low-priority PUSCH.

In one embodiment, the first offset value is a β offset value (i.e., Beta Offset) of a HARQ-ACK of low priority carried by a high-priority PUSCH.

In one embodiment, multiple pre-defined candidate offset values to which the first offset value belongs include one candidate offset value equal to 0.

In one embodiment, any candidate offset value among multiple pre-defined candidate offset values to which the first offset value belongs is greater than 0.

In one embodiment, any candidate offset value among multiple pre-defined candidate offset values to which the first offset value belongs is no less than 1.

In one embodiment, the first bit block comprises at least one HARQ-ACK bit.

In one embodiment, the first bit block only comprises one HARQ-ACK bit.

In one embodiment, the first bit block comprises no HARQ-ACK bit.

In one embodiment, the first bit block comprises 0 bit.

In one embodiment, the first bit block comprises 0 HARQ-ACK information bit.

In one embodiment, when the first bit block comprises at least one bit, any bit comprised in the first bit block is a HARQ-ACK information bit.

In one embodiment, when the first bit block comprises at least one bit, any bit comprised in the first bit block belongs to a HARQ-ACK Codebook.

In one embodiment, when the first bit block comprises at least one bit, any bit comprised in the first bit block belongs to a Type1, or Type2 or Type3 HARQ-ACK Codebook.

In one embodiment, when the first bit block comprises at least one bit, any bit comprised in the first bit block is a bit before being through channel coding.

In one embodiment, when the first bit block comprises at least one bit, any bit comprised in the first bit block is a bit not having been through a channel encoder.

In one embodiment, the first bit block comprises a CRC bit.

In one embodiment, the first bit block comprises no CRC bit.

In one embodiment, when the number of HARQ-ACK information bits comprised in the first bit block is greater than 11, the first bit block comprises a CRC bit; otherwise, the first bit block does not comprise a CRC bit.

In one embodiment, a priority corresponding to the first bit block is high priority.

In one embodiment, a priority corresponding to the first bit block is low priority.

In one embodiment, a priority index corresponding to the first bit block is equal to 1.

In one embodiment, a priority index corresponding to the first bit block is equal to 0.

In one embodiment, each HARQ-ACK bit comprised in the first bit block corresponds to a same priority.

In one embodiment, each signaling used for configuring or indicating the first bit block configures or indicates a same priority.

In one embodiment, when the first bit block comprises 0 HARQ-ACK information bit, a signaling or configuration information used to determine that the first bit block comprises 0 HARQ-ACK information bit indicates a first priority, the first bit block corresponding to the first priority.

In one embodiment, when the first bit block comprises more than 1 HARQ-ACK bit, any two HARQ-ACK bits comprised in the first bit block correspond to a same priority.

In one embodiment, a priority corresponding to the first bit block is a first priority, the target PUSCH not carrying any HARQ-ACK information bit corresponding to the first priority other than the first bit block.

In one embodiment, a priority corresponding to the first bit block is a first priority, the first bit block comprising all HARQ-ACK information bit(s) corresponding to the first priority carried by the target PUSCH.

In one embodiment, a priority corresponding to the first bit block is a first priority, any HARQ-ACK information bit corresponding to the first priority carried by the target PUSCH belonging to the first bit block.

In one embodiment, a priority corresponding to the first bit block is determined by a signaling scheduling or configuring HARQ-ACK bit(s) comprised in the first bit block.

In one embodiment, a priority of a Physical Downlink Shared Channel (PDSCH) corresponding to any HARQ-ACK bit comprised in the first bit block is equal to a first priority, where a priority corresponding to the first bit block is the first priority.

In one embodiment, a priority of a Transport Block (TB) or Code Block Group (CBG) corresponding to any HARQ-ACK bit comprised in the first bit block is equal to a first priority, where a priority corresponding to the first bit block is the first priority.

In one embodiment, a priority of a Physical Downlink Shared Channel (PDSCH) corresponding to any HARQ-ACK bit comprised in the first bit block is configured or indicated to be a first priority, where a priority corresponding to the first bit block is the first priority.

In one embodiment, a priority of a Transport Block (TB) or Code Block Group (CBG) corresponding to any HARQ-ACK bit comprised in the first bit block is configured or indicated to be a first priority, where a priority corresponding to the first bit block is the first priority.

In one embodiment, a scheduling signaling for a Physical Downlink Shared Channel (PDSCH) corresponding to any HARQ-ACK bit comprised in the first bit block indicates a first priority, where a priority corresponding to the first bit block is the first priority.

In one embodiment, a scheduling signaling for a Transport Block (TB) or Code Block Group (CBG) corresponding to any HARQ-ACK bit comprised in the first bit block indicates a first priority, where a priority corresponding to the first bit block is the first priority.

In one embodiment, the statement that "the first bit block comprises a non-negative integer number of HARQ-ACK bit(s)" in the claims includes the following meaning: the first bit block comprises a non-negative integer number of HARQ-ACK information bit(s).

In one embodiment, the statement that "the first bit block comprises a non-negative integer number of HARQ-ACK bit(s)" in the claims includes the following meaning: the first bit block comprises bit(s) generated by a non-negative integer number of HARQ-ACK information bit(s) through padding or compression.

In one embodiment, the target PUSCH is a Baseband Signal or a Radio Frequency Signal of a Physical Uplink Shared Channel (PUSCH).

In one embodiment, the target PUSCH is transmitted via an air interface or a wireless interface.

In one embodiment, the target PUSCH includes a Configured Grant-PUSCH (CG-PUSCH).

In one embodiment, the target PUSCH includes a Dynamic Grant-PUSCH (DG-PUSCH).

In one embodiment, the target PUSCH comprises a PUSCH and a DeModulation Reference Signal (DMRS).

In one embodiment, the target PUSCH is a PUSCH scheduled by DCI Format 0-0.

In one embodiment, the target PUSCH is a PUSCH scheduled by DCI Format 0-1.

In one embodiment, the target PUSCH is a PUSCH scheduled by DCI Format 0-2.

In one embodiment, any bit comprised in the target bit sequence is a Coded bit.

In one embodiment, the target bit sequence is an output bit sequence in a data and control multiplexing procedure.

In one embodiment, the target bit sequence is input bits of scrambling.

In one embodiment, the target bit sequence comprises coded bit(s) multiplexed in the target PUSCH.

In one embodiment, the statement in the claims that "the target bit sequence is used for generating the target PUSCH" includes the following meaning: the target bit sequence is used by the first node in the present application for generating the target PUSCH.

In one embodiment, the statement in the claims that "the target bit sequence is used for generating the target PUSCH" includes the following meaning: the target PUSCH carries the target bit sequence.

In one embodiment, the statement in the claims that "the target bit sequence is used for generating the target PUSCH" includes the following meaning: the target bit sequence is used to determine the target PUSCH.

In one embodiment, the statement in the claims that "the target bit sequence is used for generating the target PUSCH" includes the following meaning: the target PUSCH is generated by the target bit sequence sequentially through at least one of Scrambling, Modulation, Layer Mapping, Transform Precoding, Precoding, Mapping to Virtual resource blocks, Mapping from virtual to physical resource blocks, OFDM baseband signal generation, or Modulation and upconversion.

In one embodiment, the statement in the claims that "the target bit sequence is used for generating the target PUSCH" includes the following meaning: the target bit sequence is a coded bit sequence transmitted through Data and Control Multiplexing in the target PUSCH.

In one embodiment, the statement in the claims that "the target bit sequence is used for generating the target PUSCH" includes the following meaning: the target bit sequence is a coded bit sequence through Data and Control Multiplexing carried by the target PUSCH.

In one embodiment, bits comprised in the target bit sequence are indexed in sequence starting with "0".

In one embodiment, bits comprised in the target bit sequence are indexed in sequence in an order of 0, 1, 2 . . . .

In one embodiment, an index value of any bit comprised in the target bit sequence is a non-negative integer.

In one embodiment, an index value of any bit comprised in the target bit sequence is a positive integer.

In one embodiment, the first reference bit block at least comprises 2 bits.

In one embodiment, the first reference bit block at least comprises 3 bits.

In one embodiment, any bit comprised in the first reference bit block is a bit obtained through UCI bit sequence generation.

In one embodiment, the first reference bit block is a HARQ-ACK bit sequence obtained through UCI bit sequence generation.

In one embodiment, the first reference bit block is a HARQ-ACK bit sequence input to Code block segmentation and code block CRC attachment.

In one embodiment, the first reference bit block is a HARQ-ACK bit sequence input to Channel Coding.

In one embodiment, any bit comprised in the first reference bit block is a bit before coding.

In one embodiment, any bit comprised in the first reference bit block is a bit not having been through channel coding.

In one embodiment, the first reference bit block comprises no CRC bit.

In one embodiment, the first reference bit block comprises a CRC bit.

In one embodiment, when the number of bits comprised in the first reference bit block is greater than 11, the first reference bit block comprises a CRC bit; otherwise, the first reference bit block comprises no CRC bit.

In one embodiment, the statement that "the first bit block is used for generating a first reference bit block" in the claims includes a meaning that: the first bit block is used by the first node in the present application for generating the first reference bit block.

In one embodiment, the statement that "the first bit block is used for generating a first reference bit block" in the claims includes a meaning that: the first bit block is padded to generate the first reference bit block, or the first reference bit block is the first bit block.

In one embodiment, the statement that "the first bit block is used for generating a first reference bit block" in the claims includes a meaning that: the first bit block is padded with a bit "0" to generate the first reference bit block, or the first reference bit block is the first bit block.

In one embodiment, the statement that "the first bit block is used for generating a first reference bit block" in the claims includes a meaning that: the first bit block is padded with a bit "1" to generate the first reference bit block, or the first reference bit block is the first bit block.

In one embodiment, the statement that "the first bit block is used for generating a first reference bit block" in the claims includes a meaning that: the first bit block is through bit repetition to generate the first reference bit block, or the first reference bit block is the first bit block.

In one embodiment, the statement that "the first bit block is used for generating a first reference bit block" in the claims includes a meaning that: the first reference bit block at least comprises 2 bits; when the number of HARQ-ACK bit(s) comprised in the first bit block is equal to 0, each bit comprised in the first reference bit block is equal to "0"; when the number of HARQ-ACK bit(s) comprised in the first bit block is equal to 1, the first reference bit block is obtained by adding "0" bit to the first bit block. when the number of HARQ-ACK bits comprised in the first bit block is greater than 1, the first reference bit block is the first bit block.

In one embodiment, the statement that "the first bit block is used for generating a first reference bit block" in the claims includes a meaning that: when the number of bits comprised in the first reference bit block is greater than the number of bits comprised in the first bit block, the first reference bit block is generated by padding the first bit block with "0" bit; otherwise, the first reference bit block is the first bit block.

In one embodiment, the statement that "the first bit block is used for generating a first reference bit block" in the claims includes a meaning that: when the number of bits comprised in the first reference bit block is greater than the number of bits comprised in the first bit block, the first reference bit block is generated by padding the first bit block with "0" bit after a Least Significant Bit (LSB); otherwise, the first reference bit block is the first bit block.

In one embodiment, the statement that "the first bit block is used for generating a first reference bit block" in the claims includes a meaning that: when the number of bits comprised in the first reference bit block is greater than the number of bits comprised in the first bit block, the first reference bit block is generated by padding the first bit block with "0" bit before a Most Significant Bit (MSB); otherwise, the first reference bit block is the first bit block.

In one embodiment, the statement that "the first bit block is used for generating a first reference bit block" in the claims includes a meaning that: bits comprised in the first bit block are sequentially arranged from MSB to LSB; when the number of bits comprised in the first reference bit block is greater than the number of bits comprised in the first bit block, the first reference bit block is generated by padding the first bit block with "0" bit after a Least Significant Bit (LSB); otherwise, the first reference bit block is the first bit block.

In one embodiment, the first bit sequence is a sequence of coded bits.

In one embodiment, the first bit sequence is a bit sequence generated through channel coding and rate matching.

In one embodiment, any bit comprised in the first bit sequence is a Coded bit.

In one embodiment, any bit comprised in the first bit sequence is a bit obtained by encoding a HARQ-ACK bit.

In one embodiment, any bit comprised in the first bit sequence is a coded bit, and the channel coding used by the first bit sequence is one of Repetition Coding, simplex coding, Reed Muller (RM) Coding or Polar Coding.

In one embodiment, any bit comprised in the first bit sequence is a coded bit, and the channel coding used by the first bit sequence is one of small block length coding or Polar Coding.

In one embodiment, any bit comprised in the first bit sequence is a bit used for HARQ-ACK in an input of Data and control multiplexing.

In one embodiment, any bit comprised in the first bit sequence is a bit used for HARQ-ACK of a priority in an input of Data and control multiplexing.

In one embodiment, any bit comprised in the first bit sequence is a bit used for high-priority HARQ-ACK in an input of Data and control multiplexing.

In one embodiment, any bit comprised in the first bit sequence is a bit used for HARQ-ACKs of a same priority that is used for Data and control multiplexing.

In one embodiment, any bit comprised in the first bit sequence is a bit for HARQ-ACKs of a same priority in an output by Code block concatenation.

In one embodiment, any bit comprised in the first bit sequence is a bit in an output by Code block concatenation.

In one embodiment, all bits comprised in the first bit sequence are for a same priority.

In one embodiment, the first bit sequence is a sequence of coded bits for high-priority HARQ-ACK.

In one embodiment, the first bit sequence only comprises coded bits in the first reference bit block.

In one embodiment, the first bit sequence also comprises bits in the first reference bit block other than coded bits.

In one embodiment, the statement that "the first reference bit block is used for generating a first bit sequence" in the claims includes a meaning that: the first reference bit block is used by the first node or the second node in the present application for generating the first bit sequence.

In one embodiment, the statement that "the first reference bit block is used for generating a first bit sequence" in the claims includes a meaning that: any bit generated by bits comprised in the first reference bit block through at least one of Code block segmentation and code block CRC attachment, Channel Coding, Rate Matching, Code block concatenation, Multiplexing of coded UCI bits to PUSCH, or Data and control multiplexing belongs to the first bit sequence.

In one embodiment, the statement that "the first reference bit block is used for generating a first bit sequence" in the claims includes a meaning that: any bit generated by bits comprised in the first reference bit block through at least one of Code block segmentation and code block CRC attachment, Channel Coding, Rate Matching, or Code block concatenation belongs to the first bit sequence.

In one embodiment, the statement that "the first reference bit block is used for generating a first bit sequence" in the claims includes a meaning that: the first reference bit block is used for generating all or partial bits in the first bit sequence.

In one embodiment, the statement that "the first reference bit block is used for generating a first bit sequence" in the claims includes a meaning that: bits in the first reference bit block through channel coding and rate matching belong to the first bit sequence.

In one embodiment, the statement that "the first reference bit block is used for generating a first bit sequence" in the claims includes a meaning that: bits in the first reference bit block through channel coding and rate matching constitute the first bit sequence in an output order of channel coding.

In one embodiment, the statement that "the first reference bit block is used for generating a first bit sequence" in the claims includes a meaning that: the first bit sequence is obtained by the first reference bit block through bit repetition.

In one embodiment, the statement that "the first reference bit block is used for generating a first bit sequence" in the claims includes a meaning that: the first bit sequence is obtained by the first reference bit block through bit padding.

In one embodiment, bits comprised in the first bit sequence are indexed in sequence starting with "0".

In one embodiment, bits comprised in the first bit sequence are indexed in sequence in an order of 0, 1, 2 . . . .

In one embodiment, an index value of any bit comprised in the first bit sequence is a non-negative integer.

In one embodiment, an index value of any bit comprised in the first bit sequence is a positive integer.

In one embodiment, bits comprised in the first bit sequence are indexed in sequence in an output order of channel coding.

In one embodiment, bits comprised in the first bit sequence are indexed in sequence in an output order of channel coding and rate matching.

In one embodiment, bits comprised in the first bit sequence are indexed in sequence in an output order of Code block concatenation.

In one embodiment, the target bit sequence also comprises bit(s) other than the first bit sequence.

In one embodiment, indexes for the bits comprised in the first bit sequence are discrete in the target bit sequence.

In one embodiment, indexes for the bits comprised in the first bit sequence are contiguous in the target bit sequence.

In one embodiment, a bit comprised in the first bit sequence is indexed by a same index in the first bit sequence as in the target bit sequence.

In one embodiment, a bit comprised in the first bit sequence is indexed by a different index in the first bit sequence from that in the target bit sequence.

In one embodiment, an index for any bit comprised in the first bit sequence in the target bit sequence is positively correlated with an index for the said bit in the first bit sequence.

In one embodiment, an index for any bit comprised in the first bit sequence in the target bit sequence increases with an index for the said bit in the first bit sequence.

In one embodiment, an index for any bit comprised in the first bit sequence in the target bit sequence is negatively correlated with an index for the said bit in the first bit sequence.

In one embodiment, an index for any bit comprised in the first bit sequence in the target bit sequence is linearly correlated with an index for the said bit in the first bit sequence.

In one embodiment, an index for any bit comprised in the first bit sequence in the target bit sequence is equal to a sum of an index for the said bit in the first bit sequence and a first difference, where the first difference is a non-negative integer that is either pre-defined or signaling-configured.

In one embodiment, the statement that "the first offset value is used to determine a number of bits comprised in the first bit sequence" in the claims includes the following meaning: the first offset value is used by the first node in the present application to determine a number of bits comprised in the first bit sequence.

In one embodiment, the statement that "the first offset value is used to determine a number of bits comprised in the first bit sequence" in the claims includes the following meaning: the first offset value is used to calculate a number of bits comprised in the first bit sequence.

In one embodiment, the statement that "the first offset value is used to determine a number of bits comprised in the first bit sequence" in the claims includes the following meaning: the first offset value is used to calculate a number of Modulation Symbol(s) generated by the first bit sequence, which is further used for calculating a number of bits comprised in the first bit sequence.

In one embodiment, the statement that "the first offset value is used to determine a number of bits comprised in the first bit sequence" in the claims includes the following meaning: the first offset value is used to calculate a number per layer of Modulation Symbol(s) generated by the first bit sequence, which is further used for calculating a number of bits comprised in the first bit sequence.

In one embodiment, the statement that "the first offset value is used to determine a number of bits comprised in the first bit sequence" in the claims includes the following meaning: the first offset value is used to calculate a number per layer of Modulation Symbol(s) generated by the first bit sequence, which is further used together with a number of transmission layers and modulation order of the target PUSCH for calculating a number of bits comprised in the first bit sequence.

In one embodiment, the statement that "the first offset value is used to determine a number of bits comprised in the first bit sequence" in the claims includes the following meaning: the first offset value is used to calculate a number per layer of Modulation Symbol(s) generated by the first bit sequence, and a number of bits comprised in the first bit sequence is proportional to the number per layer of Modulation Symbol(s) generated by the first bit sequence.

In one embodiment, the statement that "the first offset value is used to determine a number of bits comprised in the first bit sequence" in the claims includes the following meaning: the number E1 of bits comprised in the first bit sequence meets $E1=N_L \cdot Q'_{UCI1} \cdot Q_m$, where $N_L$ represents a number of transmission layers of the target PUSCH, $Q_m$ represents a modulation order of the target PUSCH, and $Q'_{UCI1}$ satisfies the following formula:

$$Q'_{UCI1} = \min\left\{\left\lceil \frac{(O_{UCI1} + L_{UCI1})\beta_{offset1}^{PUSCH} N_{RE}^{PUSCH}}{\sum_{r=0}^{C_{UL-SCH}-1} K_r} \right\rceil, \lceil \alpha 1 \cdot N'_{RE} \rceil \right\}$$

Herein, $O_{UCI1}$ represents a number of HARQ-ACK information bit(s) comprised in the first bit block; $L_{UCI1}$ represents a number of CRC bit(s) (where $L_{UCI1}$ can be equal to or greater than 0);

$$\beta_{offset1}^{PUSCH}$$

represents the first offset value;

$$N_{RE}^{PUSCH}$$

represents a number of REs occupied by the target PUSCH; $K_r$ represents a size of an r-th Uplink Shared Channel (UL-SCH) code block carried by the target PUSCH; $C_{UL-SCH}$ represents a number of UL-SCH code blocks carried by the target PUSCH; α1 is a configured scale factor; $N'_{RE}$ represents a number of REs in symbol(s) occupied by the target PUSCH later than an earliest DMRS symbol.

In one embodiment, the statement that "the first offset value is used to determine a number of bits comprised in the first bit sequence" in the claims includes the following meaning: the number E1 of bits comprised in the first bit sequence meets $E1=N_L \cdot Q'_{UCI1} \cdot Q_m$, where $N_L$ represents a number of transmission layers of the target PUSCH, $Q_m$ represents a modulation order of the target PUSCH, and $Q'_{UCI1}$ satisfies the following formula:

$$Q'_{UCI1} = \min\left\{\left\lceil \frac{(O_{UCI1} + L_{UCI1}) \cdot \beta_{offset1}^{PUSCH} \cdot N_{RE}^{PUSCH}}{\sum_{r=0}^{C_{UL-SCH}-1} K_r} \right\rceil, \lceil \alpha 1 \cdot N'_{RE} \rceil \right\}$$

Herein, $O_{UCI1}$ represents a number of bit(s) comprised in the first reference bit block; $L_{UCI1}$ represents a number of CRC bit(s) (where $L_{UCI1}$ can be equal to or greater than 0);

$$\beta_{offset1}^{PUSCH}$$

represents the first offset value;

$$N_{RE}^{PUSCH}$$

represents a number of REs occupied by the target PUSCH; $K_r$ represents a size of an r-th UL-SCH code block carried by the target PUSCH; $C_{UL-SCH}$ represents a number of UL-SCH code blocks carried by the target PUSCH; α1 is a configured scale factor; $N'_{RE}$ represents a number of REs in symbol(s) occupied by the target PUSCH later than an earliest DMRS symbol.

In one embodiment, the statement that "the first offset value is used to determine a number of bits comprised in the first bit sequence" in the claims includes the following meaning: the number E1 of bits comprised in the first bit sequence meets $E1=N_L \cdot Q'_{UCI1} \cdot Q_m$, where $N_L$ represents a number of transmission layers of the target PUSCH, $Q_m$ represents a modulation order of the target PUSCH, and $Q'_{UCI1}$, satisfies the following formula:

$$Q'_{UCI1} = \min\left\{\left\lceil \frac{(O_{UCI1} + L_{UCI1}) \cdot \beta_{offset1}^{PUSCH}}{R \cdot Q_m} \right\rceil, \lceil \alpha 1 \cdot N'_{RE} \rceil \right\}$$

Herein, $O_{UCI1}$ represents a number of HARQ-ACK information bit(s) comprised in the first bit block; $L_{UCI1}$ represents a number of CRC bit(s) (where $L_{UCI1}$ can be equal to or greater than 0);

$$\beta_{offset1}^{PUSCH}$$

represents the first offset value; R represents a code rate of the target PUSCH; α1 is a configured scale factor; $N'_{RE}$ represents a number of REs in symbol(s) occupied by the target PUSCH later than an earliest DMRS symbol.

In one embodiment, the statement that "the first offset value is used to determine a number of bits comprised in the first bit sequence" in the claims includes the following meaning: the number E1 of bits comprised in the first bit sequence meets $E1=N_L \cdot Q'_{UCI1} \cdot Q_m$, where $N_L$ represents a number of transmission layers of the target PUSCH, $Q_m$ represents a modulation order of the target PUSCH, and $Q'_{UCI1}$ satisfies the following formula:

$$Q'_{UCI1} = \min\left\{\left\lceil \frac{(O_{UCI1} + L_{UCI1}) \cdot \beta_{offset1}^{PUSCH}}{R \cdot Q_m} \right\rceil, \lceil \alpha 1 \cdot N'_{RE} \rceil \right\}$$

Herein, $O_{UCI1}$ represents a number of bits comprised in the first reference bit block; $L_{UCI1}$ represents a number of CRC bit(s) (where $L_{UCI1}$ can be equal to or greater than 0);

$$\beta_{offset1}^{PUSCH}$$

represents the first offset value; R represents a code rate of the target PUSCH; α1 is a configured scale factor; $N'_{RE}$ represents a number of REs in symbol(s) occupied by the target PUSCH later than an earliest DMRS symbol.

In one embodiment, a number of transmission layers of the target PUSCH is also used to determine a number of bits comprised in the first bit sequence.

In one embodiment, modulation order of the target PUSCH is also used to determine a number of bits comprised in the first bit sequence.

In one embodiment, a code rate of the target PUSCH is also used to determine a number of bits comprised in the first bit sequence.

In one embodiment, a number of code blocks carried by the target PUSCH is also used to determine a number of bits comprised in the first bit sequence.

In one embodiment, the statement in the claims that "the number of HARQ-ACK bit(s) comprised in the first bit block is used to determine whether the first reference bit block comprises a bit other than the first bit block" includes a meaning that: the number of HARQ-ACK bit(s) comprised in the first bit block is used by the first node in the present application to determine whether the first reference bit block comprises any bit other than the first bit block.

In one embodiment, the statement in the claims that "the number of HARQ-ACK bit(s) comprised in the first bit block is used to determine whether the first reference bit block comprises a bit other than the first bit block" includes a meaning that: the number of HARQ-ACK bit(s) comprised in the first bit block is used to determine whether the first reference bit block comprises a padding bit.

In one embodiment, the statement in the claims that "the number of HARQ-ACK bit(s) comprised in the first bit block is used to determine whether the first reference bit block comprises a bit other than the first bit block" includes a meaning that: the number of HARQ-ACK bit(s) comprised in the first bit block is used to determine whether the first reference bit block comprises a preset bit.

In one embodiment, the statement in the claims that "the number of HARQ-ACK bit(s) comprised in the first bit block is used to determine whether the first reference bit block comprises a bit other than the first bit block" includes a meaning that: the number of HARQ-ACK bit(s) comprised in the first bit block is used to determine whether the first reference bit block comprises a bit preset to "0".

In one embodiment, the statement in the claims that "the number of HARQ-ACK bit(s) comprised in the first bit block is used to determine whether the first reference bit block comprises a bit other than the first bit block" includes a meaning that: the number of HARQ-ACK bit(s) comprised in the first bit block is used to determine whether the first reference bit block is generated by the first bit block through padding or adding a pre-configured bit.

In one embodiment, the statement in the claims that "the number of HARQ-ACK bit(s) comprised in the first bit block is used to determine whether the first reference bit block comprises a bit other than the first bit block" includes a meaning that: when the number of HARQ-ACK bits comprised in the first bit block is less than 2, the first reference bit block comprises bit(s) other than the first bit block; otherwise, the first reference bit block does not comprise any bit other than the first bit block.

In one embodiment, the statement in the claims that "the number of HARQ-ACK bit(s) comprised in the first bit block is used to determine whether the first reference bit block comprises a bit other than the first bit block" includes a meaning that: the number of HARQ-ACK bit(s) comprised in the first bit block is used to determine whether the number of bit(s) comprised in the first reference bit block is equal to the number of HARQ-ACK bit(s) comprised in the first bit block.

In one embodiment, the statement in the claims that "the number of HARQ-ACK bit(s) comprised in the first bit block is used to determine whether the first reference bit block comprises a bit other than the first bit block" includes a meaning that: the number of HARQ-ACK bit(s) comprised in the first bit block is used to determine whether the number of bit(s) comprised in the first reference bit block is larger than the number of HARQ-ACK bit(s) comprised in the first bit block.

In one embodiment, the statement in the claims that "the number of HARQ-ACK bit(s) comprised in the first bit block is used to determine whether the first reference bit block comprises a bit other than the first bit block" includes a meaning that: when the number of HARQ-ACK bit(s) comprised in the first bit block is less than 2, the first reference bit block is generated by padding "0" bit to the first bit block, the first reference bit block comprising 2 bits; when the number of HARQ-ACK bits comprised in the first bit block is greater than or equal to 2, the first reference bit block is the first bit block.

In one embodiment, the statement in the claims that "the number of HARQ-ACK bit(s) comprised in the first bit block is used to determine whether the first reference bit block comprises a bit other than the first bit block" includes a meaning that: when the number of HARQ-ACK bit(s) comprised in the first bit block is equal to 0, the first reference bit block comprises 2 "0" bits; when the number of HARQ-ACK bit(s) comprised in the first bit block is equal to 1, the first reference bit block comprises one bit and a "0" bit comprised in the first bit block; when the number of HARQ-ACK bits comprised in the first bit block is greater than 1, the first reference bit block is the first bit block.

In one embodiment, the statement that "the first reference bit block and the first bit block are the same" in the claims includes a meaning that: each bit comprised in the first reference bit block is the same as a corresponding bit comprised in the first bit block.

In one embodiment, the statement that "the first reference bit block and the first bit block are the same" in the claims includes a meaning that: the first reference bit block and the first bit block are a same bit block.

In one embodiment, the statement that "the first reference bit block and the first bit block are the same" in the claims includes a meaning that: bits in the first reference bit block are indexed from 0 in sequence, and bits in the first bit block are indexed from 0 in sequence, where any two bits in the first reference bit block and the first bit block sharing a same index are the same bit.

In one embodiment, the X1 candidate conditions are pre-defined, or the X1 candidate conditions are configured by signaling.

In one embodiment, any two of the X1 candidate conditions are different.

In one embodiment, the X1 candidate conditions are fixed.

In one embodiment, X1 is equal to 2.

In one embodiment, X1 is greater than 2.

In one embodiment, the X1 candidate conditions are related to the type of multiplexed UCI bits supported in the target PUSCH.

In one embodiment, the X1 is related to the category of multiplexed information bits supported in the target PUSCH.

In one embodiment, the X1 is related to a number of combinations of multiplexed information bits supported in the target PUSCH.

In one embodiment, one of the X1 candidate conditions includes: the target PUSCH is not used for carrying a UL-SCH, and the target PUSCH is used for carrying Channel Status Information (CSI) Part 1 rather than CSI Part 2.

In one embodiment, one of the X1 candidate conditions includes: the target PUSCH is not used for carrying any information bit other than HARQ-ACK.

In one embodiment, one of the X1 candidate conditions includes: the target PUSCH is not used for carrying a UL-SCH.

In one embodiment, one of the X1 candidate conditions includes: the target PUSCH is not used for carrying CSI Part 1.

In one embodiment, one of the X1 candidate conditions includes: the target PUSCH is not used for carrying CSI.

In one embodiment, one of the X1 candidate conditions includes: the target PUSCH is not used for carrying a UL-SCH or CSI.

In one embodiment, one of the X1 candidate conditions includes: the target PUSCH is not used for carrying a UL-SCH or CSI Part 1.

In one embodiment, one of the X1 candidate conditions includes: the target PUSCH is not used for carrying a UL-SCH but is used for carrying CSI Part 1.

In one embodiment, a priority corresponding to a HARQ-ACK bit is a priority of a PDSCH corresponding to the HARQ-ACK bit.

In one embodiment, a priority corresponding to a HARQ-ACK bit is a priority of a Transport Block (TB) corresponding to the HARQ-ACK bit.

In one embodiment, a priority corresponding to a HARQ-ACK bit is a value of a priority index corresponding to the HARQ-ACK bit.

In one embodiment, a priority corresponding to a HARQ-ACK bit is a value of a Priority Indicator carried by a DCI Format associated with the HARQ-ACK bit.

In one embodiment, a priority corresponding to a HARQ-ACK bit is a value of a priority index of a PDSCH, where the HARQ-ACK bit is used for indicating whether the PDSCH is correctly decoded.

In one embodiment, a priority corresponding to a HARQ-ACK bit is a priority of a PDSCH, where the HARQ-ACK bit is used for indicating whether the PDSCH is correctly decoded, and the priority of the PDSCH is a value of a Priority Indicator carried by a DCI format scheduling the PDSCH.

In one embodiment, a priority corresponding to a HARQ-ACK bit is obtained by configuration of signaling or is default or pre-defined.

In one embodiment, the first information block is used for indicating a number of priority/priorities corresponding to HARQ-ACK(s) that the target PUSCH is used to carry.

In one embodiment, an information block other than the first information block is used for indicating a number of priority/priorities corresponding to HARQ-ACK(s) that the target PUSCH is used to carry.

In one embodiment, a number of priority/priorities corresponding to HARQ-ACK(s) that the target PUSCH is used to carry is equal to 1 or 2.

In one embodiment, a number of priorities corresponding to HARQ-ACKs that the target PUSCH is used to carry is greater than 2.

In one embodiment, a number of priorities corresponding to HARQ-ACKs that the target PUSCH is used to carry is a total number of priorities corresponding to all HARQ-ACK bits that the target PUSCH is used to carry.

In one embodiment, when the priority/priorities corresponding to HARQ-ACK(s) that the target PUSCH is used to carry only includes/include high priority or only includes/include low priority, the number of priority/priorities corresponding to HARQ-ACK(s) that the target PUSCH is used to carry is equal to 1; when the priorities corresponding to HARQ-ACKs that the target PUSCH is used to carry both include high priority and low priority, the number of priorities corresponding to HARQ-ACKs that the target PUSCH is used to carry is equal to 2.

In one embodiment, priority/priorities corresponding to HARQ-ACK(s) that the target PUSCH is used to carry includes/include at least one of high priority or low priority.

In one embodiment, when high-priority and low-priority HARQ-ACKs are simultaneously multiplexed in the target PUSCH, a number of priorities corresponding to HARQ-ACKs that the target PUSCH is used to carry is equal to 2; otherwise, a number of priority/priorities corresponding to HARQ-ACK(s) that the target PUSCH is used to carry is equal to 1.

In one embodiment, the statement in the claims that "a number of priority/priorities corresponding to HARQ-ACK(s) that the target PUSCH is used to carry is used to determine the target condition out of the X1 candidate conditions" includes the following meaning: the number of priority/priorities corresponding to HARQ-ACK(s) that the target PUSCH is used to carry is used by the first node in the present application to determine the target condition out of the X1 candidate conditions.

In one embodiment, the statement in the claims that "a number of priority/priorities corresponding to HARQ-ACK(s) that the target PUSCH is used to carry is used to determine the target condition out of the X1 candidate conditions" includes the following meaning: whether the target PUSCH carries high-priority HARQ-ACK and low-priority HARQ-ACK simultaneously is used to determine the target condition out of the X1 candidate conditions, where X1 is equal to 2.

In one embodiment, the statement in the claims that "a number of priority/priorities corresponding to HARQ-ACK(s) that the target PUSCH is used to carry is used to determine the target condition out of the X1 candidate conditions" includes the following meaning: whether the target PUSCH carries different priorities of HARQ-ACKs simultaneously is used to determine the target condition out of the X1 candidate conditions, where X1 is equal to 2.

In one embodiment, the statement in the claims that "a number of priority/priorities corresponding to HARQ-ACK(s) that the target PUSCH is used to carry is used to determine the target condition out of the X1 candidate conditions" includes the following meaning: whether different priorities of HARQ-ACKs are multiplexed in the target PUSCH is used to determine the target condition out of the X1 candidate conditions, where X1 is equal to 2.

In one embodiment, the statement in the claims that "a number of priority/priorities corresponding to HARQ-ACK(s) that the target PUSCH is used to carry is used to determine the target condition out of the X1 candidate conditions" includes the following meaning: the number of priority/priorities corresponding to HARQ-ACK(s) that the target PUSCH is used to carry and a number of types of UCIs that the target PUSCH is used to carry are used together to determine the target condition out of the X1 candidate conditions.

In one embodiment, the statement in the claims that "a number of priority/priorities corresponding to HARQ-ACK(s) that the target PUSCH is used to carry is used to determine the target condition out of the X1 candidate conditions" includes the following meaning: the number of priority/priorities corresponding to HARQ-ACK(s) that the target PUSCH is used to carry and a UL-SCH whether the target PUSCH is used to carry are used together to determine the target condition out of the X1 candidate conditions.

In one embodiment, the statement in the claims that "a number of priority/priorities corresponding to HARQ-ACK(s) that the target PUSCH is used to carry is used to determine the target condition out of the X1 candidate conditions" includes the following meaning: whether the number of priority/priorities corresponding to HARQ- ACK(s) that the target PUSCH is used to carry is equal to 1 or 2 is used to determine the target condition out of the X1 candidate conditions.

In one embodiment, the statement in the claims that "a number of priority/priorities corresponding to HARQ-ACK(s) that the target PUSCH is used to carry is used to determine the target condition out of the X1 candidate conditions" is implemented through Claim 2 in the present application.

In one embodiment, the statement in the claims that "a number of priority/priorities corresponding to HARQ-ACK(s) that the target PUSCH is used to carry is used to determine the target condition out of the X1 candidate conditions" includes the following meaning: when high-priority and low-priority HARQ-ACKs are multiplexed in the target PUSCH, the target condition is one of the X1 candidate conditions; otherwise, the target condition is the other one of the X1 candidate conditions.

In one embodiment, the statement in the claims that "a number of priority/priorities corresponding to HARQ-ACK(s) that the target PUSCH is used to carry is used to determine the target condition out of the X1 candidate conditions" includes the following meaning: when the number of priority/priorities corresponding to HARQ-ACK(s) that the target PUSCH is used to carry is equal to 1, the target condition is a first candidate condition among the X1 candidate conditions; when the number of priorities corresponding to HARQ-ACKs that the target PUSCH is used to carry is equal to 2 and a number of type(s) of UCI(s) other than the HARQ-ACKs that the target PUSCH is used to carry is equal to 1, the target condition is a second candidate condition among the X1 candidate conditions; when the number of priorities corresponding to HARQ-ACKs that the target PUSCH is used to carry is equal to 2 and a number of type(s) of UCI(s) other than the HARQ-ACKs that the target PUSCH is used to carry is equal to 2, the target condition is a third candidate condition among the X1 candidate conditions. In one subsidiary embodiment of the above embodiment, CSI part 1 and CSI part 2 belong to different types of UCIs. In one subsidiary embodiment of the above embodiment, CSI part 1 and CSI part 2 belong to a same type of UCI. In one subsidiary embodiment of the above embodiment, high-priority UCI and low-priority UCI are two different types of UCIs.

In one embodiment, the statement in the claims that "a number of priority/priorities corresponding to HARQ-ACK(s) that the target PUSCH is used to carry is used to determine the target condition out of the X1 candidate conditions" includes the following meaning: when the number of priority/priorities corresponding to HARQ-ACK(s) that the target PUSCH is used to carry is equal to 1, the target condition is a first candidate condition among the X1 candidate conditions; when the number of priorities corresponding to HARQ-ACKs that the target PUSCH is used to carry is equal to 2 and the target PUSCH is used to carry a UL-SCH, the target condition is a second candidate condition among the X1 candidate conditions; when the number of priorities corresponding to HARQ-ACKs that the target PUSCH is used to carry is equal to 2 and the target PUSCH is not used to carry a UL-SCH, the target condition is a third candidate condition among the X1 candidate conditions.

In one embodiment, "a number of priority/priorities corresponding to HARQ-ACK(s) that the target PUSCH is used to carry" and "different priorities of HARQ-ACKs whether the target PUSCH is used to carry" have equivalent meanings or can be replaced by one another.

In one embodiment, "a number of priority/priorities corresponding to HARQ-ACK(s) that the target PUSCH is used to carry" and "whether the target PUSCH carries HARQ-ACK(s) and, if so, whether the target PUSCH is used to carry different priorities of HARQ-ACKs" have equivalent meanings or can be replaced by one another.

In one embodiment, "a number of priority/priorities corresponding to HARQ-ACK(s) that the target PUSCH is used to carry is equal to 0" and "the target PUSCH does not carry HARQ-ACK(s)" have equivalent meanings or can be replaced by one another.

In one embodiment, "a number of priority/priorities corresponding to HARQ-ACK(s) that the target PUSCH is used to carry is equal to 0" and "the target PUSCH has no available HARQ-ACK(s) to carry" have equivalent meanings or can be replaced by one another.

In one embodiment, "a number of priority/priorities corresponding to HARQ-ACK(s) that the target PUSCH is used to carry is equal to 0" and "there is neither HARQ-ACK corresponding to high priority nor HARQ-ACK corresponding to low priority being transmitted in the target PUSCH" have equivalent meanings or can be replaced by one another.

In one embodiment, "a number of priority/priorities corresponding to HARQ-ACK(s) that the target PUSCH is used to carry is equal to 1" and "the target PUSCH carries HARQ-ACK(s) and the HARQ-ACK(s) carried by the target PUSCH corresponds/correspond to a same priority" have equivalent meanings or can be replaced by one another.

In one embodiment, "a number of priority/priorities corresponding to HARQ-ACK(s) that the target PUSCH is used to carry is equal to 1" and "the target PUSCH carries HARQ-ACK(s) and the HARQ-ACK(s) multiplexed in the target PUSCH corresponds/correspond to a same priority" have equivalent meanings or can be replaced by one another.

In one embodiment, "a number of priority/priorities corresponding to HARQ-ACK(s) that the target PUSCH is used to carry is equal to 1" and "the first node is configured by higher layer not to multiplex different priorities of HARQ-ACKs in a PUSCH or the first node is configured by higher layer to multiplex different priorities of HARQ-ACKs in a PUSCH but the HARQ-ACKs multiplexed in the target PUSCH correspond to a same priority" have equivalent meanings or can be replaced by one another.

In one embodiment, "a number of priority/priorities corresponding to HARQ-ACK(s) that the target PUSCH is used to carry is equal to 1" and "the first node is configured by higher layer to close multiplexing of different priorities of HARQ-ACKs in a PUSCH or the first node is configured by higher layer to open multiplexing of different priorities of HARQ-ACKs in a PUSCH but the HARQ-ACKs multiplexed in the target PUSCH correspond to a same priority" have equivalent meanings or can be replaced by one another.

In one embodiment, "a number of priority/priorities corresponding to HARQ-ACK(s) that the target PUSCH is used to carry is equal to 2" and "the target PUSCH is used to carry different priorities of HARQ-ACKs" have equivalent meanings or can be replaced by one another.

In one embodiment, "a number of priority/priorities corresponding to HARQ-ACK(s) that the target PUSCH is used to carry is equal to 2" and "different priorities of HARQ-ACKs are multiplexed in the target PUSCH" have equivalent meanings or can be replaced by one another.

In one embodiment, "a number of priority/priorities corresponding to HARQ-ACK(s) that the target PUSCH is used to carry is equal to 2" and "the first node is configured by higher layer to carry different priorities of HARQ-ACKs in a PUSCH and the target PUSCH is used to carry different priorities of HARQ-ACKs" have equivalent meanings or can be replaced by one another.

In one embodiment, "a number of priority/priorities corresponding to HARQ-ACK(s) that the target PUSCH is used to carry is equal to 2" and "the first node is configured by higher layer to open multiplexing of different priorities of HARQ-ACKs in a PUSCH and different priorities of HARQ-ACKs are multiplexed in the target PUSCH" have equivalent meanings or can be replaced by one another.

Embodiment 2

Figure 2:
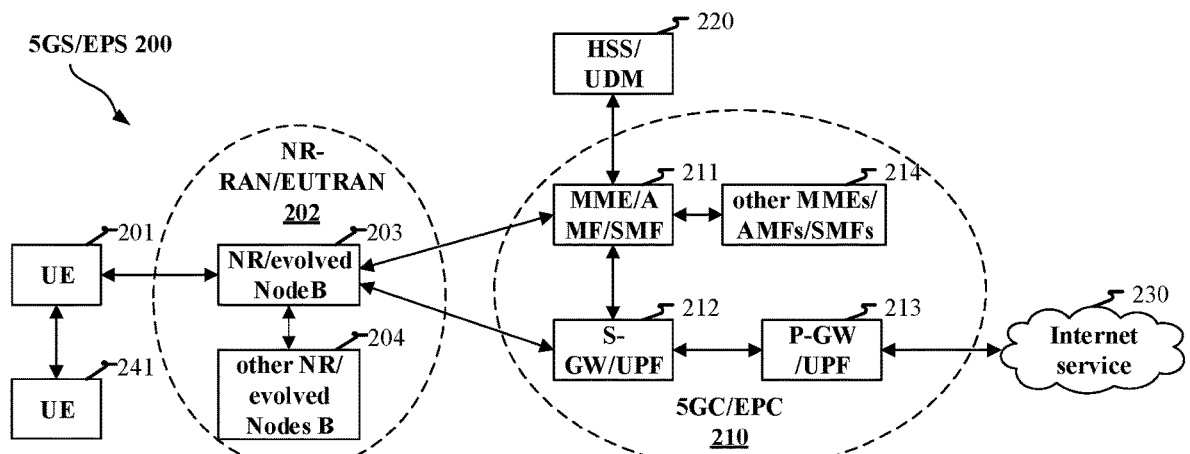
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR/evolved node B (gNB/eNB) 203 and other gNBs(eNBs) 204. The gNB(eNB) 203 provides UE 201 oriented user plane and control plane terminations. The gNB(eNB) 203 may be connected to other gNBs(eNBs) 204 via an Xn/X2 interface (for example, backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, test equipment, test instrument or test tools, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports transmissions of multiplexed UCIs associated with different priorities.

In one embodiment, the gNB(eNB) 203 corresponds to the second node in the present application.

In one embodiment, the gNB(eNB) 203 supports transmissions of multiplexed UCIs associated with different priorities.

Embodiment 3

Figure 3:
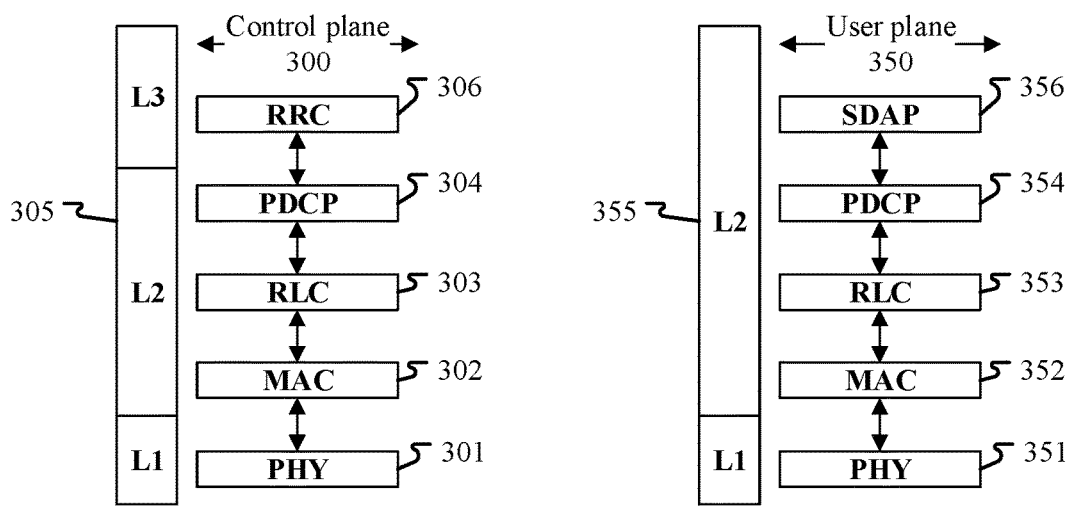
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 used for a first node (UE or gNB) and a second node (gNB or UE) is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first node and the second node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides multiplexing among variable radio bearers and logical channels. The PDCP sublayer 304 provides security by encrypting a packet and provides support for handover of a first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the first node in the present application.

In one embodiment, the first information block in the present application is generated by the RRC306, or the MAC302, or the MAC352, or by the PHY301, or the PHY351.

In one embodiment, the target PUSCH in the present application is generated by the RRC306, or the MAC302, or the MAC352, or by the PHY301, or the PHY351.

In one embodiment, the first signaling in the present application is generated by the RRC306, or the MAC302, or the MAC352, or by the PHY301, or the PHY351.

Embodiment 4

Figure 4:
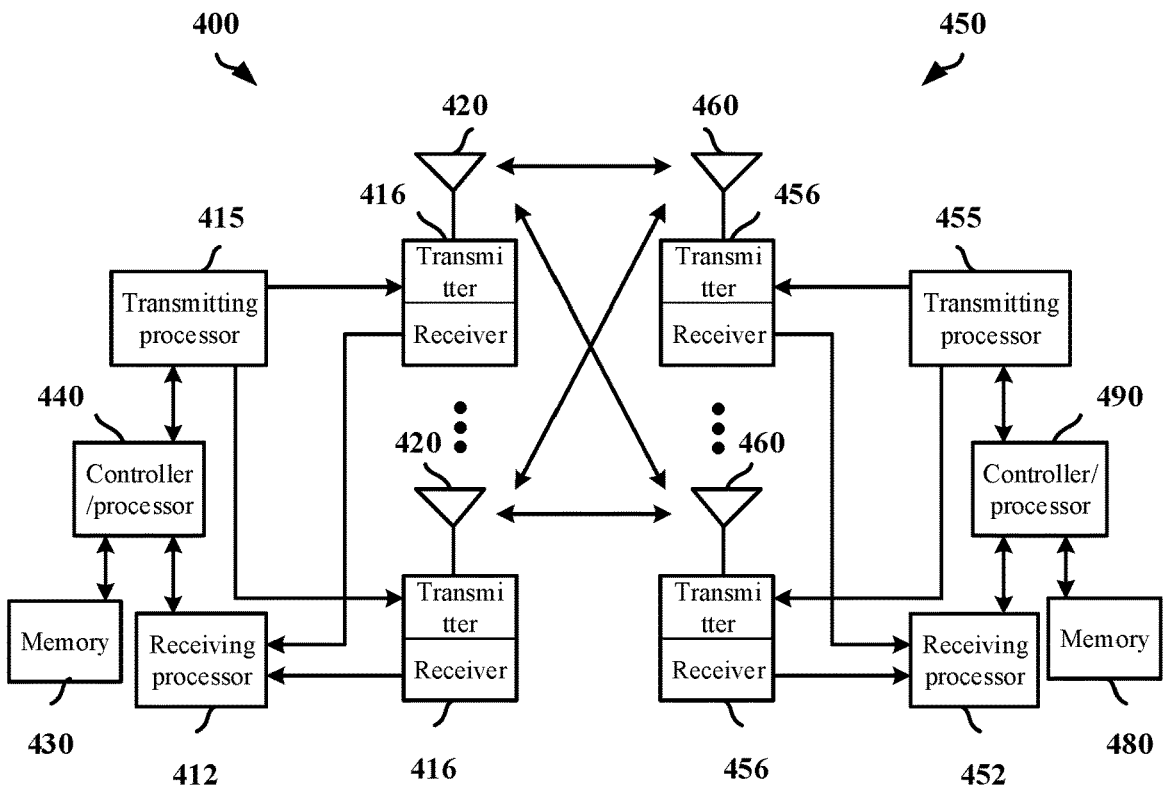
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), an upper-layer packet, for instance upper-layer information contained in the first information block in the present application and upper-layer information contained in the first signaling (when the first signaling comprises upper-layer information) in the present application, are provided to the controller/processor 440. The controller/processor 440 provides functions of the L2 layer and above. In DL, the controller/processor 440 provides header compression, encryption, packet segmentation and reordering, multiplexing between a logical channel and a transport channel as well as radio resources allocation for the first node 450 based on various priorities. The controller/processor 440 is also responsible for HARQ operation, a retransmission of a lost packet and a signaling to the first node 450, for instance, higher-layer information carried in the first information block and higher-layer information carried in the first signaling (when the first signaling comprises higher-layer information) in the present application are generated in the controller/processor 440. The transmitting processor 415 performs various signal processing functions used for the L1 (that is, PHY), including coding, interleaving, scrambling, modulating, power control/allocating, pre-coding and physical layer control signaling generation, for example, the generations of the first signaling (when the first signaling only comprises physical-layer information) and a physical layer signal carrying the first information block in the present application are completed in the transmitting processor 415. Modulation symbols that have been generated are divided into parallel streams and each of them is mapped onto a corresponding multicarrier subcarrier and/or multicarrier symbol, and then is mapped by the transmitting processor 415 to the antenna 420 via the transmitter 416 to be transmitted in the form of radio frequency signals. At the receiving end, each receiver 456 receives a radio frequency signal via a corresponding antenna 460, and recovers baseband information modulated onto a radio frequency carrier and provides the baseband information to the receiving processor 452. The receiving processor 452 performs various signal receiving processing functions used for the L1. Signal receiving processing functions include receiving a physical layer signal carrying the first information block and the first signaling in the present application, and demodulating multicarrier symbols in multicarrier symbol streams based on various modulation schemes (i.E., BPSK, QPSK), then de-scrambling, decoding and de-interleaving to recover data or control signal transmitted by the second node 410 on a physical channel, and providing the data and control signal to the controller/processor 490. The controller/processor 490 is in charge of the L2 and above layers; the controller/processor 490 interprets higher-layer information carried in the first information block and in the first signaling (when the first signaling comprises upper-layer information) in the present application. The controller/processor can be associated with the memory 480 that stores program code and data; the memory 480 may be called a computer readable medium.

In Uplink (UL) transmission, which is similar to DL, higher-layer information, including what is carried by the target PUSCH in the present application (when carrying higher-layer information), is generated by the controller/processor 490 and processed by the transmitting processor 455 to provide various signal transmitting processing functions used for the L1 (i.e., PHY), for example, the generation of a physical layer signal of the target PUSCH in the present application is completed in the transmitting processor 455 and mapped by the transmitting processor 455 to the antenna 460 via the transmitter 456 to be transmitted in the form of radio frequency signal. The receiver 416 receives a radio frequency signal via a corresponding antenna 420, and each receiver 416 recovers baseband information modulated onto a radio frequency carrier and provides the baseband information to the receiving processor 412. The receiving processor 412 performs various signal reception processing functions used for L1 (i.e., PHY), including receiving a physical layer signal of the target PUSCH in the present application and then providing data and/or control signal to the controller/processor 440. Functions of the L2 performed by the controller/processor 440 include interpreting higher-layer information, including interpreting higher-layer information carried in the target PUSCH (when it carries the higher-layer information) in the present application. The controller/processor can be associated with the buffer 430 that stores program code and data; the buffer 430 may be called a computer readable medium.

In one embodiment, the first node 450 comprises at least one processor and at least one memory, the at least one memory comprises computer program codes; The at least one memory and the computer program codes are configured to be used in collaboration with the at least one processor. The first node 450 at least receives a first information block, the first information block being used to determine a first offset value, the first offset value being a non-negative number; and determines a first bit block and transmitting a target PUSCH, where a target bit sequence is used for generating the target PUSCH, the target bit sequence comprising multiple sequentially indexed bits; herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, the first node 450 comprises a memory that stores a computer readable instruction program, the computer readable instruction program generates actions when executed by at least one processor, which include: receiving a first information block, the first information block being used to determine a first offset value, the first offset value being a non-negative number; and determining a first bit block and transmitting a target PUSCH, where a target bit sequence is used for generating the target PUSCH, the target bit sequence comprising multiple sequentially indexed bits; herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, the second device 410 comprises at least one processor and at least one memory, the at least one memory comprises computer program codes; the at least one memory and the computer program codes are configured to be used in collaboration with the at least one processor. The second device 410 at least: transmits a first information block, the first information block being used to indicate a first offset value, the first offset value being a non-negative number; and receives a target PUSCH and determining a first bit block, where a target bit sequence is used for generating the target PUSCH, the target bit sequence comprising multiple sequentially indexed bits; herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, the second node 410 comprises a memory that stores a computer readable instruction program, the computer readable instruction program generates actions when executed by at least one processor, which include: transmitting a first information block, the first information block being used to indicate a first offset value, the first offset value being a non-negative number; and receiving a target PUSCH and determining a first bit block, where a target bit sequence is used for generating the target PUSCH, the target bit sequence comprising multiple sequentially indexed bits; herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, the first node 450 is a UE.

In one embodiment, the first node 450 is a UE supporting transmission of multiplexed information associated with different priorities.

In one embodiment, the second node 410 is a base station (gNB/eNB).

In one embodiment, the second node 410 is a base station supporting transmission of multiplexed information associated with different priorities.

In one embodiment, the receiver 456 (comprising the antenna 460), the receiving processor 452 and the controller/processor 490 are used for receiving the first information block in the present application.

In one embodiment, the transmitter 456 (comprising the antenna 460), the transmitting processor 455 and the controller/processor 490 are used for transmitting the target PUSCH in the present application.

In one embodiment, the receiver 456 (comprising the antenna 460) and the receiving processor 452 are used for receiving the first signaling in the present application.

In one embodiment, the receiver 456 (comprising the antenna 460), the receiving processor 452 and the controller/processor 490 are used for receiving the first signaling in the present application.

In one embodiment, the transmitter 416 (comprising the antenna 420), the transmitting processor 415 and the controller/processor 440 are used for transmitting the first information block in the present application.

In one embodiment, the receiver 416 (comprising the antenna 420), the receiving processor 412 and the controller/processor 440 are used for receiving the target PUSCH in the present application.

In one embodiment, the transmitter 416 (comprising the antenna 420) and the transmitting processor 415 are used for transmitting the first signaling in the present application.

In one embodiment, the transmitter 416 (comprising the antenna 420), the transmitting processor 415 and the controller/processor 440 are used for transmitting the first signaling in the present application.

Embodiment 5

Figure 5:
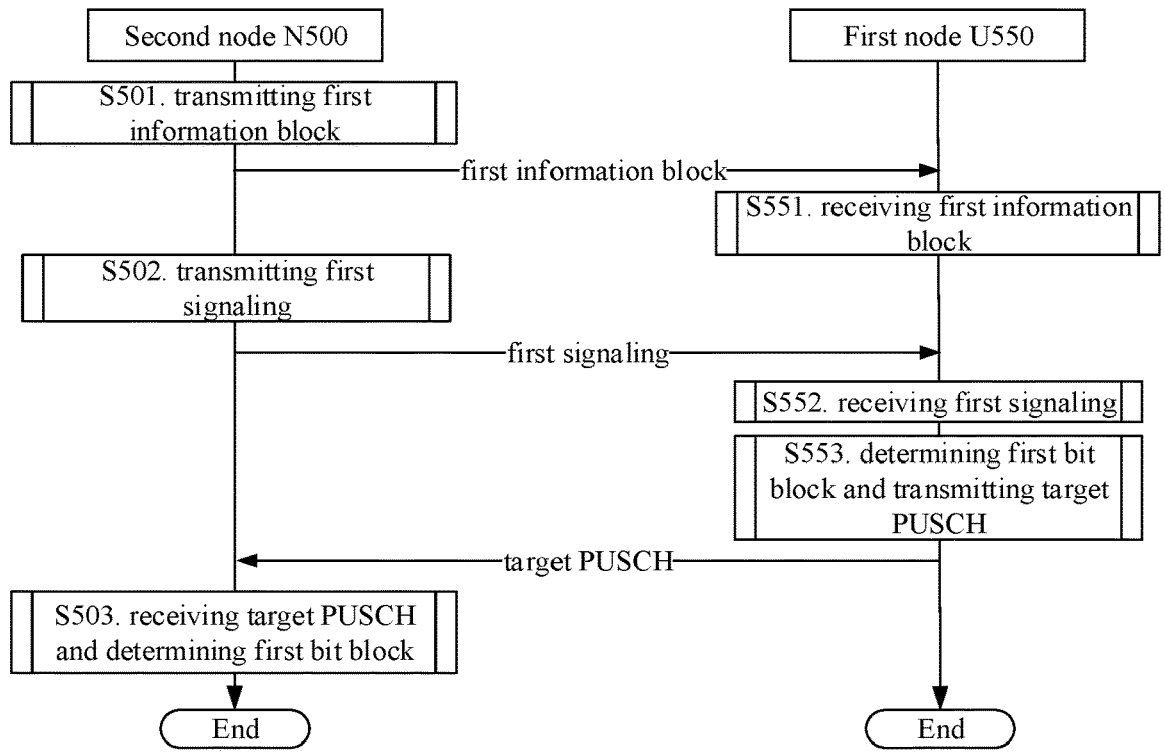
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a second node N500 is a maintenance base station for a serving cell for a first node U550. It should be particularly noted that the sequence illustrated herein does not set any limit to the signal transmission order or implementation order in the present application.

The second node N500 transmits a first information block in step S501, transmits a first signaling in step S502, and receives a target PUSCH and determines a first bit block in step S503.

The first node U550 receives a first information block in step S551, receives a first signaling in step S552, and determines a first bit block and transmits a target PUSCH in step S553.

In Embodiment 5, the first information block is used to determine a first offset value, the first offset value being a non-negative number; and a target bit sequence is used for generating the target PUSCH, the target bit sequence comprising multiple sequentially indexed bits; the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions; the first signaling is used to determine time-frequency resources occupied by the target PUSCH.

In one embodiment, the first signaling is transmitted via an air interface or a wireless interface.

In one embodiment, the first signaling comprises all or part of a higher layer signaling or a physical layer signaling.

In one embodiment, the first signaling comprises all or part of a Radio Resource Control (RRC) layer signaling or a Medium Access Control (MAC) layer signaling.

In one embodiment, the first signaling is UE-specific.

In one embodiment, the first signaling is Per Bandwidth-Part (BWP) Configured.

In one embodiment, the first signaling is transmitted through a PDCCH.

In one embodiment, the first signaling comprises all or partial fields in a DCI format.

In one embodiment, the first signaling comprises one of DCI Format 0_0, DCI Format 01, or DCI Format 0_2.

In one embodiment, the first signaling comprises one of DCI Format 0_1 or DCI Format 0_2.

In one embodiment, the first signaling comprises partial or all fields in a DCI format that schedules the target PUSCH.

In one embodiment, the first signaling is used to determine whether the target PUSCH is used for carrying a UL-SCH.

In one embodiment, the first signaling is used to determine a modulation and coding scheme for the target PUSCH.

In one embodiment, the first signaling is used to determine a priority corresponding to the target PUSCH.

In one embodiment, the statement in the claims that "the first signaling is used to determine time-frequency resources occupied by the target PUSCH" includes the following meaning: the first signaling is used by the first node in the present application to determine time-frequency resources occupied by the target PUSCH;

In one embodiment, the statement in the claims that "the first signaling is used to determine time-frequency resources occupied by the target PUSCH" includes the following meaning: the first signaling is used for explicitly or implicitly indicating time-frequency resources occupied by the target PUSCH.

In one embodiment, the statement in the claims that "the first signaling is used to determine time-frequency resources occupied by the target PUSCH" includes the following meaning: one or multiple fields comprised in the first signaling is/are used for explicitly or implicitly indicating time-frequency resources occupied by the target PUSCH.

Embodiment 6

Figure 6:
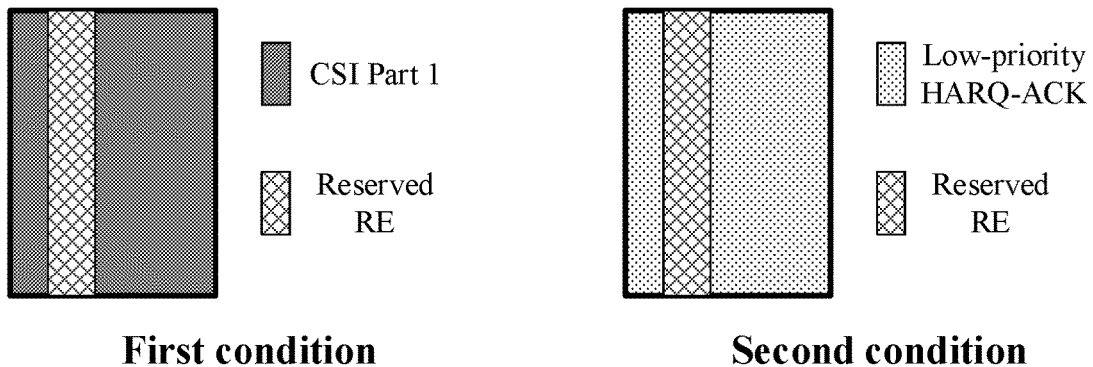
FIG. 6 illustrates a schematic diagram of a first condition and a second condition according to one embodiment of the present application.

Embodiment 6 illustrates a schematic diagram of a first condition and a second condition according to one embodiment of the present application, as shown in FIG. 6. In FIG. 6, for a first condition and a second condition, the rectangular zone with thick-lined frame represents a target PUSCH, and the rectangle filled with cross lines represents REs reserved for HARQ-ACK; with regard to the first condition, the zone filled with dark grey represents CSI Part 1; with regard to the second condition, the zone filled with light grey represents low-priority HARQ-ACK.

In Embodiment 6, when the number of priority/priorities corresponding to HARQ-ACK(s) that the target PUSCH in the present application is used to carry is no greater than 1, the target condition in the present application is a first condition; when the number of priorities corresponding to HARQ-ACKs that the target PUSCH is used to carry is equal to 2, the target condition is a second condition; the first condition is one of the X1 candidate conditions in the present application, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

In one embodiment, when the target PUSCH does not carry any HARQ-ACK bit, the number of priority/priorities corresponding to HARQ-ACK bit(s) that the target PUSCH is used to carry is equal to 0.

In one embodiment, a number of priority/priorities corresponding to HARQ-ACK bit(s) that the target PUSCH is used to carry can only be equal to 1 or 2.

In one embodiment, a number of priority/priorities corresponding to HARQ-ACK bit(s) that the target PUSCH is used to carry can only be equal to 0 or 2.

In one embodiment, a number of priority/priorities corresponding to HARQ-ACK bit(s) that the target PUSCH is used to carry can only be equal to 0, 1 or 2.

In one embodiment, a number of priority/priorities corresponding to HARQ-ACK bit(s) that the target PUSCH is used to carry can also be a positive integer other than 1 or 2.

In one embodiment, a number of priority/priorities corresponding to HARQ-ACK bit(s) that the target PUSCH is used to carry is a number among multiple candidate numbers, where any of the multiple candidate numbers is a positive integer, the multiple candidate numbers only including 1 and 2.

In one embodiment, a number of priority/priorities corresponding to HARQ-ACK bit(s) that the target PUSCH is used to carry is a number among multiple candidate numbers, where any of the multiple candidate numbers is a positive integer, the multiple candidate numbers only including 0, 1 and 2.

In one embodiment, a number of priority/priorities corresponding to HARQ-ACK bit(s) that the target PUSCH is used to carry is a number among multiple candidate numbers, where any of the multiple candidate numbers is a positive integer, the multiple candidate numbers including at least one positive integer greater than 2.

In one embodiment, the statements in the claims that "when the number of priority/priorities corresponding to HARQ-ACK(s) that the target PUSCH is used to carry is no greater than 1" and "when there is no HARQ-ACK being carried (or multiplexed) in the target PUSCH or when HARQ-ACK(s) carried (or multiplexed) in the target PUSCH corresponds/correspond to a same priority" have equivalent meanings or can be replaced by one another.

In one embodiment, the statements in the claims that "when the number of priority/priorities corresponding to HARQ-ACK(s) that the target PUSCH is used to carry is no greater than 1" and "when there is no HARQ-ACK being carried (or multiplexed) in the target PUSCH" have equivalent meanings or can be replaced by one another.

In one embodiment, the statements in the claims that "when the number of priority/priorities corresponding to HARQ-ACK(s) that the target PUSCH is used to carry is no greater than 1" and "when HARQ-ACK(s) carried (or multiplexed) in the target PUSCH corresponds/correspond to a same priority" have equivalent meanings or can be replaced by one another.

In one embodiment, the statements in the claims that "when the number of priorities corresponding to HARQ-ACKs that the target PUSCH is used to carry is equal to 2" and "when HARQ-ACKs corresponding to different priorities are carried (or multiplexed) in the target PUSCH" have equivalent meanings or can be replaced by one another.

In one embodiment, the first condition and the second condition are different.

In one embodiment, the first condition and the second condition at least share a same sub-condition, the first condition being different from the second condition.

In one embodiment, the first condition and the second condition do not share any same sub-condition, the first condition being different from the second condition.

In one embodiment, the statement in the claims that "the target PUSCH is not used for carrying a UL-SCH and that the target PUSCH is used for carrying CSI part 1 rather than CSI part 2" includes a meaning that: UCI is transmitted in the target PUSCH, the target PUSCH not including a UL-SCH, the UCI comprising the CSI part 1 and not comprising the CSI part 2.

In one embodiment, the statement in the claims that "the target PUSCH is not used for carrying a UL-SCH and that the target PUSCH is used for carrying CSI part 1 rather than CSI part 2" includes a meaning that: the target PUSCH does not carry a UL-SCH, and the target PUSCH carries UCI, the UCI carried by the target PUSCH comprising CSI Part 1 but not comprising CSI Part 2.

In one embodiment, the statement in the claims that "the target PUSCH is not used for carrying any information bit other than the HARQ-ACK(s)" includes the following meaning: the target PUSCH is not used for carrying CSI or a UL-SCH.

In one embodiment, the statement in the claims that "the target PUSCH is not used for carrying any information bit other than the HARQ-ACK(s)" includes the following meaning: the target PUSCH is not used for carrying any one of CSI part 1, CSI part 2 or a UL-SCH.

In one embodiment, the statement in the claims that "the target PUSCH is not used for carrying any information bit other than the HARQ-ACK(s)" includes the following meaning: the target PUSCH is not used for carrying CSI, nor is it used for carrying a UL-SCH.

In one embodiment, the statement in the claims that "the target PUSCH is not used for carrying any information bit other than the HARQ-ACK(s)" includes the following meaning: the target PUSCH is not used for carrying CSI part 1, nor is it used for carrying CSI part 2 or a UL-SCH.

In one embodiment, the statement in the claims that "the target PUSCH is not used for carrying any information bit other than the HARQ-ACK(s)" includes the following meaning: the target PUSCH is not used for carrying a UL-SCH.

In one embodiment, the statement in the claims that "the target PUSCH is not used for carrying any information bit other than the HARQ-ACK(s)" includes the following meaning: the target PUSCH is not used for carrying CSI.

In one embodiment, the statement in the claims that "the target PUSCH is not used for carrying any information bit other than the HARQ-ACK(s)" includes the following meaning: the target PUSCH is not used for carrying a UL-SCH nor is it used for carrying CSI Part 1.

In one embodiment, the statement in the claims that "the target PUSCH is not used for carrying any information bit other than the HARQ-ACK(s)" includes the following meaning: the target PUSCH is not used for carrying a UL-SCH or CSI Part 1.

In one embodiment, the UL-SCH, CSI part 1 and CSI part 2 all belong to information bits other than HARQ-ACK(s).

In one embodiment, only the UL-SCH belongs to information bits other than HARQ-ACK(s).

In one embodiment, only the UL-SCH and CSI part 1 belong to information bits other than HARQ-ACK(s).

Embodiment 7

Figure 7:
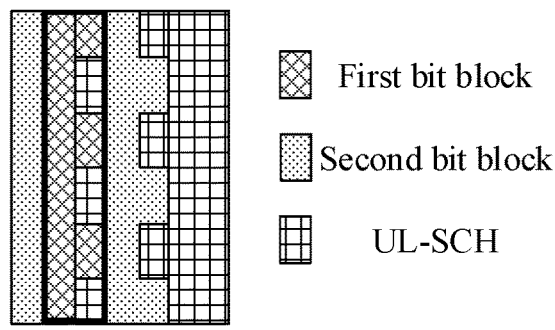
FIG. 7 illustrates a schematic diagram illustrating a relation between a first bit block and a second bit block according to one embodiment of the present application.

Embodiment 7 illustrates a schematic diagram illustrating a relation between a first bit block and a second bit block according to one embodiment of the present application, as shown in FIG. 7. In FIG. 7, the cross-filled zone represents resources mapped by modulation symbol(s) generated by a first bit block; the dot-filled zone represents resources mapped by modulation symbol(s) generated by a second bit block; the reticle-filled zone represents resources mapped by modulation symbol(s) generated by a UL-SCH; the rectangular zone with thick-line frame represents REs reserved for HARQ-ACK.

In Embodiment 7, the first information block in the present application is used to determine a second offset value, and the target PUSCH in the present application is used for carrying a second bit block, the second bit block comprising at least one HARQ-ACK bit; the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value in the present application is used together with a first reference numerical value to determine a number of RE(s) comprised in the first time-frequency resource block; a number of bits comprised in the first reference bit block (bit size of the first reference bit block) in the present application is equal to the first reference numerical value; when the number of HARQ-ACK bit(s) comprised in the first bit block in the present application is no greater than 2, any RE mapped by a modulation symbol generated by the second bit sequence is orthogonal with the first time-frequency resource block.

In one embodiment, any bit comprised in the second bit block is a HARQ-ACK information bit.

In one embodiment, any bit comprised in the second bit block belongs to a HARQ-ACK Codebook.

In one embodiment, any bit comprised in the second bit block belongs to a Type1, or Type2 or Type3 HARQ-ACK Codebook.

In one embodiment, any bit comprised in the second bit block is a bit before channel coding.

In one embodiment, any bit comprised in the second bit block is a bit not having been through channel encoder.

In one embodiment, the second bit block comprises a CRC bit.

In one embodiment, the second bit block comprises no CRC bit.

In one embodiment, when the number of HARQ-ACK information bits comprised in the second bit block is greater than 11, the second bit block comprises a CRC bit; otherwise, the second bit block does not comprise a CRC bit.

In one embodiment, a priority corresponding to the second bit block is low priority.

In one embodiment, a priority index corresponding to the second bit block is equal to 0.

In one embodiment, a priority corresponding to the second bit block is different from a priority corresponding to the first bit block.

In one embodiment, a priority corresponding to the second bit block is the same as a priority configured for the target PUSCH.

In one embodiment, a priority corresponding to the second bit block is different from a priority configured for the target PUSCH.

In one embodiment, when the target PUSCH carries a UL-SCH, a priority corresponding to the second bit block and a priority of the UL-SCH carried by the target PUSCH are the same.

In one embodiment, when the target PUSCH carries a UL-SCH, a priority corresponding to the second bit block and a priority of the UL-SCH carried by the target PUSCH are different.

In one embodiment, each HARQ-ACK bit comprised in the second bit block corresponds to a same priority.

In one embodiment, each signaling used for configuring or indicating the second bit block configures or indicates a same priority.

In one embodiment, when the second bit block comprises more than 1 HARQ-ACK bit, any two HARQ-ACK bits comprised in the second bit block correspond to a same priority.

In one embodiment, a priority corresponding to the second bit block is a second priority, the target PUSCH not carrying any HARQ-ACK information bit corresponding to the second priority other than the second bit block.

In one embodiment, a priority corresponding to the second bit block is a second priority, the second bit block comprising all HARQ-ACK information bits corresponding to the second priority carried by the target PUSCH.

In one embodiment, a priority corresponding to the second bit block is a second priority, any HARQ-ACK information bit corresponding to the second priority carried by the target PUSCH belonging to the second bit block.

In one embodiment, a priority corresponding to the second bit block is determined by a signaling scheduling or configuring HARQ-ACK bit(s) comprised in the second bit block.

In one embodiment, a priority of a Physical Downlink Shared Channel (PDSCH) corresponding to any HARQ-ACK bit comprised in the second bit block is equal to a second priority, where a priority corresponding to the second bit block is the second priority.

In one embodiment, a priority of a Transport Block (TB) or Code Block Group (CBG) corresponding to any HARQ-ACK bit comprised in the second bit block is equal to a second priority, where a priority corresponding to the second bit block is the second priority.

In one embodiment, a priority of a Physical Downlink Shared Channel (PDSCH) corresponding to any HARQ-ACK bit comprised in the second bit block is configured or indicated to be a second priority, where a priority corresponding to the second bit block is the second priority.

In one embodiment, a priority of a Transport Block (TB) or Code Block Group (CBG) corresponding to any HARQ-ACK bit comprised in the second bit block is configured or indicated to be a second priority, where a priority corresponding to the second bit block is the second priority.

In one embodiment, a scheduling signaling for a Physical Downlink Shared Channel (PDSCH) corresponding to any HARQ-ACK bit comprised in the second bit block indicates a second priority, where a priority corresponding to the second bit block is the second priority.

In one embodiment, a scheduling signaling for a Transport Block (TB) or Code Block Group (CBG) corresponding to any HARQ-ACK bit comprised in the second bit block indicates a second priority, where a priority corresponding to the second bit block is the second priority.

In one embodiment, the statement of "the first information block being used to determine a second offset value" in the claims includes a meaning that: the first information block is used by the first node in the present application to determine the second offset value.

In one embodiment, the statement of "the first information block being used to determine a second offset value" in the claims includes a meaning that: the first information block is used for explicitly or implicitly indicating the second offset value.

In one embodiment, the statement of "the first information block being used to determine a second offset value" in the claims includes a meaning that: the first information block is used for explicitly or implicitly indicating an index of the second offset value.

In one embodiment, the statement of "the first information block being used to determine a second offset value" in the claims includes a meaning that: the first information block is used for explicitly or implicitly indicating an offset value index combination including an index of the second offset value, the offset value index combination comprising indexes of β offset values of Uplink Control Information (UCI) of different types or having different ranges of numbers of information bits.

In one embodiment, the statement of "the first information block being used to determine a second offset value" in the claims includes a meaning that: the first information block is used for explicitly or implicitly determining multiple offset value index combinations, the multiple offset value index combinations including an offset value index combination to which an index of the second offset value belongs, any of the multiple offset value index combinations comprises indexes of β offset values of Uplink Control Information (UCI) of different types or having different ranges of numbers of information bits.

In one embodiment, the statement of "the first information block being used to determine a second offset value" in the claims includes a meaning that: the first information block is used for explicitly or implicitly indicating an offset value index combination including an index of the second offset value, the offset value index combination comprising indexes of β offset values of Uplink Control Information (UCI) of different types or using different types of channel encoders.

In one embodiment, the statement of "the first information block being used to determine a second offset value" in the claims includes a meaning that: the first information block is used for explicitly or implicitly determining multiple offset value index combinations, the multiple offset value index combinations including an offset value index combination to which an index of the second offset value belongs, any of the multiple offset value index combinations comprises indexes of β offset values of Uplink Control Information (UCI) of different types or using different types of channel encoders.

In one embodiment, the statement of "the first information block being used to determine a second offset value" in the claims includes a meaning that: the first information block is used for explicitly or implicitly determining multiple offset values including the second offset value.

In one embodiment, the statement of "the first information block being used to determine a second offset value" in the claims includes a meaning that: the first information block is used for explicitly or implicitly determining an offset value set including the second offset value.

In one embodiment, the statement of "the first information block being used to determine a second offset value" in the claims includes a meaning that: the first information block is used for explicitly or implicitly determining an offset value list including the second offset value.

In one embodiment, the statement of "the first information block being used to determine a second offset value" in the claims includes a meaning that: the first information block is used for explicitly or implicitly determining multiple offset value sets, where one of the multiple offset value sets comprises the second offset value.

In one embodiment, the statement of "the first information block being used to determine a second offset value" in the claims includes a meaning that: the first information block is used for explicitly or implicitly determining the Y1 offset value sets in the present application.

In one embodiment, the second offset value is a β offset value (i.e., Beta Offset).

In one embodiment, the second offset value is a β offset value (i.e., Beta Offset) of a HARQ-ACK no greater than 2 bits.

In one embodiment, the second offset value is a β offset value (i.e., Beta Offset) of a HARQ-ACK greater than 2 bits and no greater than 11 bits.

In one embodiment, the second offset value is a β offset value (i.e., Beta Offset) of a HARQ-ACK greater than 11 bits.

In one embodiment, the second offset value is a β offset value (i.e., Beta Offset) of a HARQ-ACK of high priority.

In one embodiment, the second offset value is a β offset value (i.e., Beta Offset) of a HARQ-ACK of low priority.

In one embodiment, the second offset value is a β offset value (i.e., Beta Offset) of a HARQ-ACK of high priority carried by a low-priority PUSCH.

In one embodiment, the second offset value is a β offset value (i.e., Beta Offset) of a HARQ-ACK of high priority carried by a high-priority PUSCH.

In one embodiment, the second offset value is a β offset value (i.e., Beta Offset) of a HARQ-ACK of low priority carried by a low-priority PUSCH.

In one embodiment, the second offset value is a β offset value (i.e., Beta Offset) of a HARQ-ACK of low priority carried by a high-priority PUSCH.

In one embodiment, multiple pre-defined candidate offset values to which the second offset value belongs include one candidate offset value equal to 0.

In one embodiment, any candidate offset value among multiple pre-defined candidate offset values to which the second offset value belongs is greater than 0.

In one embodiment, any candidate offset value among multiple pre-defined candidate offset values to which the second offset value belongs is no less than 1.

In one embodiment, the first offset value and the second offset value are independently configured.

In one embodiment, the first offset value and the second offset value may or may not be equal.

In one embodiment, the first offset value and the second offset value are configured by two different fields in a same RRC layer signaling or a same IE.

In one embodiment, the first offset value and the second offset value belong to a same pre-defined or configured offset value set.

In one embodiment, the first offset value and the second offset value respectively belong to different pre-defined or configured offset value sets.

In one embodiment, the second bit sequence is a sequence of coded bits.

In one embodiment, the second bit sequence is a bit sequence generated through channel coding and rate matching.

In one embodiment, any bit comprised in the second bit sequence is a Coded bit.

In one embodiment, any bit comprised in the second bit sequence is a coded bit, and the channel coding used by the second bit sequence is one of Repetition Coding, simplex coding, Reed Muller (RM) Coding or Polar Coding.

In one embodiment, any bit comprised in the second bit sequence is a coded bit, and the channel coding used by the second bit sequence is one of small block length coding or Polar Coding.

In one embodiment, any bit comprised in the second bit sequence is a bit used for HARQ-ACK in an input of Data and control multiplexing.

In one embodiment, any bit comprised in the second bit sequence is a bit used for HARQ-ACKs of a same priority in an input of Data and control multiplexing.

In one embodiment, any bit comprised in the second bit sequence is a bit used for low-priority HARQ-ACK in an input of Data and control multiplexing.

In one embodiment, any bit comprised in the second bit sequence is a bit for HARQ-ACKs of a same priority in an output by Code block concatenation.

In one embodiment, any bit comprised in the second bit sequence is a bit in an output by Code block concatenation.

In one embodiment, all bits comprised in the second bit sequence are for a same priority.

In one embodiment, the second bit sequence is a sequence of coded bits for low-priority HARQ-ACK.

In one embodiment, the second bit sequence only comprises coded bits for the second bit block.

In one embodiment, the second bit sequence also comprises bits in the second bit block other than coded bits.

In one embodiment, the statement that "the second bit block is used for generating a second bit sequence" in the claims includes a meaning that: the second bit block is used by the first node or the second node in the present application for generating the second bit sequence.

In one embodiment, the statement that "the second bit block is used for generating a second bit sequence" in the claims includes a meaning that: the second bit sequence is generated by bits comprised in the second bit block through at least one of UCI bit sequence generation, Code block segmentation and code block CRC attachment, Channel Coding, Rate Matching, Code block concatenation, Multiplexing of coded UCI bits to PUSCH, or Data and control multiplexing.

In one embodiment, the statement that "the second bit block is used for generating a second bit sequence" in the claims includes a meaning that: the second bit sequence is generated by bits comprised in the second bit block through at least one of UCI bit sequence generation, Code block segmentation and code block CRC attachment, Channel Coding, Rate Matching, or Code block concatenation.

In one embodiment, the statement that "the second bit block is used for generating a second bit sequence" in the claims includes a meaning that: the second bit block is used for generating all or partial bits in the second bit sequence.

In one embodiment, the statement that "the second bit block is used for generating a second bit sequence" in the claims includes a meaning that: bits in the second bit block through UCI bit sequence generation, channel coding and rate matching belong to the second bit sequence.

In one embodiment, the statement that "the second bit block is used for generating a second bit sequence" in the claims includes a meaning that: bits in the second bit block sequentially through UCI bit sequence generation, channel coding and rate matching constitute the second bit sequence in an output order of channel coding.

In one embodiment, the statement that "the second bit block is used for generating a second bit sequence" in the claims includes a meaning that: the second bit sequence is obtained by the second bit block through one of bit repetition, bit compression or bit padding.

In one embodiment, bits comprised in the second bit sequence are indexed in sequence starting with "0".

In one embodiment, bits comprised in the second bit sequence are indexed in sequence in an order of 0, 1, 2 . . . .

In one embodiment, an index value of any bit comprised in the second bit sequence is a non-negative integer.

In one embodiment, an index value of any bit comprised in the second bit sequence is a positive integer.

In one embodiment, bits comprised in the second bit sequence are indexed in sequence in an output order of channel coding.

In one embodiment, bits comprised in the second bit sequence are indexed in sequence in an output order of channel coding and rate matching.

In one embodiment, bits comprised in the second bit sequence are indexed in sequence in an output order of Code block concatenation.

In one embodiment, the target bit sequence also comprises bit(s) other than the second bit sequence.

In one embodiment, indexes for the bits comprised in the second bit sequence are discrete in the target bit sequence.

In one embodiment, indexes for the bits comprised in the second bit sequence are contiguous in the target bit sequence.

In one embodiment, a bit comprised in the second bit sequence is indexed by a same index in the second bit sequence as in the target bit sequence.

In one embodiment, a bit comprised in the second bit sequence is indexed by a different index in the second bit sequence from that in the target bit sequence.

In one embodiment, an index for any bit comprised in the second bit sequence in the target bit sequence is positively correlated with an index for the said bit in the second bit sequence.

In one embodiment, an index for any bit comprised in the second bit sequence in the target bit sequence increases with an index for the said bit in the second bit sequence.

In one embodiment, an index for any bit comprised in the second bit sequence in the target bit sequence is negatively correlated with an index for the said bit in the second bit sequence.

In one embodiment, an index for any bit comprised in the first bit sequence in the target bit sequence is linearly correlated with an index for the said bit in the first bit sequence.

In one embodiment, an index for any bit comprised in the second bit sequence in the target bit sequence is equal to a sum of an index for the said bit in the second bit sequence and a second difference, where the second difference is a non-negative integer that is either pre-defined or signaling-configured.

In one embodiment, any RE comprised in the first time-frequency resource block is an RE reserved for HARQ-ACK in Data and control multiplexing.

In one embodiment, any RE comprised in the first time-frequency resource block is a Reserved RE determined through a first step in Data and control multiplexing.

In one embodiment, the first time-frequency resource block comprises RE(s) reserved for potential HARQ-ACK transmission.

In one embodiment, the first time-frequency resource block comprises RE(s) used for HARQ-ACK punctured transmission.

In one embodiment, the first time-frequency resource block comprises RE(s) used for HARQ-ACK puncturing other UCI or UL-SCH transmission.

In one embodiment, the first time-frequency resource block comprises RE(s) used for HARQ-ACK puncturing CSI Part2 or UL-SCH transmission.

In one embodiment, the first time-frequency resource block is reserved for high-priority HARQ-ACK.

In one embodiment, the first time-frequency resource block is reserved for low-priority HARQ-ACK.

In one embodiment, the first time-frequency resource block can be reserved for high-priority HARQ-ACK and low-priority HARQ-ACK.

In one embodiment, the first time-frequency resource block is actually occupied by HARQ-ACK.

In one embodiment, the first time-frequency resource block is not actually occupied by HARQ-ACK.

In one embodiment, only partial REs in the first time-frequency resource block are actually occupied by HARQ-ACK.

In one embodiment, REs comprised in the first time-frequency resource block are discretely distributed across frequency domain.

In one embodiment, REs comprised in the first time-frequency resource block are continuously distributed across frequency domain.

In one embodiment, REs comprised in the first time-frequency resource block are discretely distributed across time domain.

In one embodiment, REs comprised in the first time-frequency resource block are continuously distributed across time domain.

In one embodiment, the first reference numerical value is a positive integer.

In one embodiment, the first reference numerical value is equal to 2.

In one embodiment, the first reference numerical value is equal to 3.

In one embodiment, the first reference numerical value is fixed.

In one embodiment, the first reference numerical value is pre-defined or configured by signaling.

In one embodiment, the statement in the claims that "at least one of the first offset value or the second offset value is used together with a first reference numerical value to determine a number of RE(s) comprised in the first time-frequency resource block" includes the following meaning: at least one of the first offset value or the second offset value is used together with the first reference numerical value by the first node in the present application to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: the first offset value is used together with the first reference numerical value to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: the second offset value is used together with the first reference numerical value to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: the first offset value, the second offset value and the first reference numerical value are used together to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: when the number of HARQ-ACK bit(s) comprised in the first bit block is greater than 0, only the first offset value between the first offset value and the second offset value is used together to determine a number of RE(s) comprised in the first time-frequency resource block; when the number of HARQ-ACK bit(s) comprised in the first bit block is equal to 0, only the second offset value between the first offset value and the second offset value is used together to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: at least one of the first offset value or the second offset value is used together with the first reference numerical value to calculate a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: a larger value between the first offset value and the second offset value is used together with the first reference numerical value to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: a smaller value between the first offset value and the second offset value is used together with the first reference numerical value to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: an offset value between the first offset value and the second offset value that enables a larger number of REs comprised in the first time-frequency resource block is used together with the first reference numerical value to determine a number of RE(s) comprised in the first time-frequency resource block.

In one embodiment, the statement in the claims that "at least one of the first offset value or the second offset value is used together with a first reference numerical value to determine a number of RE(s) comprised in the first time-frequency resource block" includes the following meaning: When the target PUSCH carries a UL-SCH, the number of RE(s) comprised in the first time-frequency resource block $Q'_{UCI\_reserve}$ meets the following formula:

$$Q'_{UCI\_reserve} = \min\left\{\left\lceil \frac{(O_{UCI\_ref} + L_{UCI\_ref}) \cdot \beta^{PUSCH}_{offset} \cdot N^{PUSCH}_{RE}}{\sum_{r=0}^{C_{UL-SCH}-1} K_r} \right\rceil, \lceil \alpha\_\text{ref} \cdot N'_{RE} \rceil \right\}$$

When the target PUSCH does not carry a UL-SCH, the number of RE(s) comprised in the first time-frequency resource block $Q'_{UCI}$ meets the following formula:

$$Q'_{UCI\_reserve} = \min\left\{\left\lceil \frac{(O_{UCI\_ref} + L_{UCI\_ref}) \cdot \beta^{PUSCH}_{offset}}{R \cdot Q_m} \right\rceil, \lceil \alpha\_\text{ref} \cdot N'_{RE} \rceil \right\}$$

Herein, $O_{UCI\_ref}$ represents the first reference numerical value; $L_{UCI\_ref}$ represents a number of CRC bit(s) (where $L_{UCI\_ref}$ can be equal to or greater than 0);

$$\beta^{PUSCH}_{offset}$$

represents the first offset value;

$$N^{PUSCH}_{RE}$$

represents a number of REs occupied by the target PUSCH; $K_r$ represents a size of an r-th Uplink Shared Channel (UL-SCH) code block carried by the target PUSCH; $C_{UL-SCH}$ represents a number of UL-SCH code blocks carried by the target PUSCH; R represents a code rate of the target PUSCH; $Q_m$ represents a modulation order of the target PUSCH; α_ref is a configured scale factor; $N'_{RE}$ represents a number of REs in symbol(s) occupied by the target PUSCH later than an earliest DMRS symbol.

In one embodiment, the statement in the claims that "at least one of the first offset value or the second offset value is used together with a first reference numerical value to determine a number of RE(s) comprised in the first time-frequency resource block" includes the following meaning: When the target PUSCH carries a UL-SCH, the number of RE(s) comprised in the first time-frequency resource block $Q'_{UCI\_reserve}$ meets the following formula:

$$Q'_{UCI\_reserve} = \min\left\{\left\lceil \frac{(O_{UCI\_ref} + L_{UCI\_ref}) \cdot \beta^{PUSCH}_{offset} \cdot N^{PUSCH}_{RE}}{\sum_{r=0}^{C_{UL-SCH}-1} K_r} \right\rceil, \lceil \alpha\_\text{ref} \cdot N'_{RE} \rceil \right\}$$

When the target PUSCH does not carry a UL-SCH, the number of RE(s) comprised in the first time-frequency resource block $Q'_{UCI}$ meets the following formula:

$$Q'_{UCI\_reserve} = \min\left\{\left\lceil \frac{(O_{UCI\_ref} + L_{UCI\_ref}) \cdot \beta^{PUSCH}_{offset}}{R \cdot Q_m} \right\rceil, \lceil \alpha\_\text{ref} \cdot N'_{RE} \rceil \right\}$$

Herein, $O_{UCI\_ref}$ represents the first reference numerical value; $L_{UCI\_ref}$ represents a number of CRC bit(s) (where $L_{UCI\_ref}$ can be equal to or greater than 0);

$$\beta^{PUSCH}_{offset}$$

represents the second offset value;

$$N^{PUSCH}_{RE}$$

represents a number of REs occupied by the target PUSCH; $K_r$ represents a size of an r-th Uplink Shared Channel (UL-SCH) code block carried by the target PUSCH; $C_{UL-SCH}$ represents a number of UL-SCH code blocks carried by the target PUSCH; R represents a code rate of the target PUSCH; $Q_m$ represents a modulation order of the target PUSCH; α_ref is a configured scale factor; $N'_{RE}$ represents a number of REs in symbol(s) occupied by the target PUSCH later than an earliest DMRS symbol.

In one embodiment, the statement in the claims that "at least one of the first offset value or the second offset value is used together with a first reference numerical value to determine a number of RE(s) comprised in the first time-frequency resource block" includes the following meaning: When the target PUSCH carries a UL-SCH, the number of RE(s) comprised in the first time-frequency resource block $Q'_{UCI\_reserve}$ meets the following formula:

$$Q'_{UCI\_reserve} = \min\left\{\left\lceil \frac{(O_{UCI\_ref} + L_{UCI\_ref}) \cdot \beta^{PUSCH}_{offset} \cdot N^{PUSCH}_{RE}}{\sum_{r=0}^{C_{UL-SCH}-1} K_r} \right\rceil, \lceil \alpha\_ref \cdot N'_{RE} \rceil \right\}$$

When the target PUSCH does not carry a UL-SCH, the number of RE(s) comprised in the first time-frequency resource block $Q'_{UCI}$ meets the following formula:

$$Q'_{UCI\_reserve} = \min\left\{\left\lceil \frac{(O_{UCI\_ref} + L_{UCI\_ref}) \cdot \beta^{PUSCH}_{offset}}{R \cdot Q_m} \right\rceil, \lceil \alpha\_ref \cdot N'_{RE} \rceil \right\}$$

Herein, $O_{UCI\_ref}$ represents the first reference numerical value; $L_{UCI\_ref}$ represents a number of CRC bit(s) (where $L_{UCI\_ref}$ can be equal to or greater than 0);

$$\beta^{PUSCH}_{offset}$$

represents a larger one of the first offset value and the second offset value;

$N_{RE}^{PUSCH}$ represents a number of REs occupied by the target PUSCH; $K_r$ represents a size of an r-th Uplink Shared Channel (UL-SCH) code block carried by the target PUSCH; $C_{UL-SCH}$ represents a number of UL-SCH code blocks carried by the target PUSCH; R represents a code rate of the target PUSCH; $Q_m$ represents a modulation order of the target PUSCH; α_ref is a configured scale factor; $N'_{RE}$ represents a number of REs in symbol(s) occupied by the target PUSCH later than an earliest DMRS symbol.

In one embodiment, the number of HARQ-ACK bit(s) comprised in the first bit block is used to determine whether the first offset value or the second offset value is used for calculating the number of RE(s) comprised in the first time-frequency resource block.

In one embodiment, when the number of HARQ-ACK bit(s) comprised in the first bit block is equal to 0, at least one RE mapped by a modulation symbol generated by the second bit sequence belongs to the first time-frequency resource block.

In one embodiment, when the number of HARQ-ACK bit(s) comprised in the first bit block is equal to 0, any RE mapped by a modulation symbol generated by the second bit sequence is orthogonal with the first time-frequency resource block.

In one embodiment, the statement that "when the number of HARQ-ACK bit(s) comprised in the first bit block is no greater than 2" in the claims includes the following meaning: when the number of HARQ-ACK bit(s) comprised in the first bit block is equal to 0, 1 or 2.

In one embodiment, the statement that "when the number of HARQ-ACK bit(s) comprised in the first bit block is no greater than 2" in the claims includes the following meaning: when the number of HARQ-ACK bit(s) comprised in the first bit block is equal to 1 or 2.

In one embodiment, when the number of HARQ-ACK bit(s) comprised in the first bit block is equal to 0, and the number of HARQ-ACK bit(s) comprised in the second bit block is no greater than 2, any RE mapped by a modulation symbol generated by the second bit sequence belongs to the first time-frequency resource block; when the number of HARQ-ACK bit(s) comprised in the first bit block is equal to 0, and the number of HARQ-ACK bit(s) comprised in the second bit block is greater than 2, at least one RE mapped by a modulation symbol generated by the second bit sequence belongs to outside of the first time-frequency resource block.

In one embodiment, when the number of HARQ-ACK bit(s) comprised in the first bit block is equal to 0, the number of HARQ-ACK bit(s) comprised in the second bit block is used to determine whether any RE mapped by a modulation symbol generated by the second bit sequence belongs to the first time-frequency resource block.

In one embodiment, the statement that "any RE mapped by a modulation symbol generated by the second bit sequence is orthogonal with the first time-frequency resource block" includes a meaning that: any RE mapped by a modulation symbol generated by the second bit sequence does not belong to the first time-frequency resource block.

In one embodiment, the statement that "any RE mapped by a modulation symbol generated by the second bit sequence is orthogonal with the first time-frequency resource block" includes a meaning that: any RE mapped by a modulation symbol generated by the second bit sequence when mapping to physical resource blocks does not belong to the first time-frequency resource block.

In one embodiment, the statement that "any RE mapped by a modulation symbol generated by the second bit sequence is orthogonal with the first time-frequency resource block" includes a meaning that: any RE mapped by a modulation symbol generated by the second bit sequence is outside the first time-frequency resource block.

In one embodiment, the statement that "any RE mapped by a modulation symbol generated by the second bit sequence is orthogonal with the first time-frequency resource block" includes a meaning that: when mapping to physical resource blocks the modulation symbol generated by the second bit sequence performs rate matching on REs comprised in the first time-frequency resource block.

In one embodiment, the statement that "any RE mapped by a modulation symbol generated by the second bit sequence is orthogonal with the first time-frequency resource block" includes a meaning that: the modulation symbol generated by the second bit sequence is not mapped on any RE comprised in the first time-frequency resource block.

Embodiment 8

Figure 8:
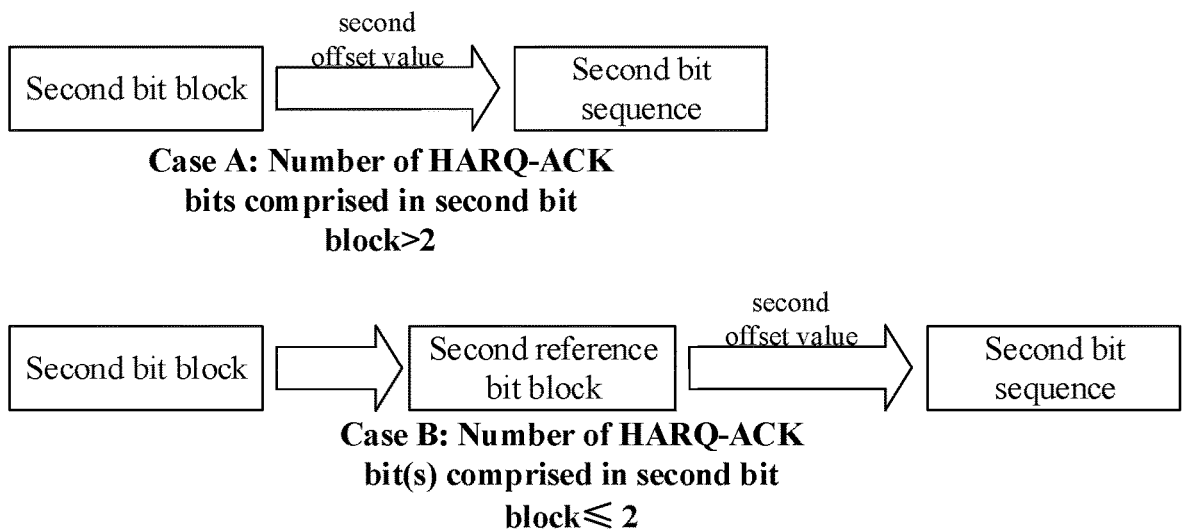
FIG. 8 illustrates a schematic diagram illustrating a relation between a second bit block and a second bit sequence according to one embodiment of the present application.

Embodiment 8 illustrates a schematic diagram illustrating a relation between a second bit block and a second bit sequence according to one embodiment of the present application, as shown in FIG. 8. In FIG. 8, as illustrated in Case A, a second offset value and a number of HARQ-ACK bit(s) comprised in a second bit block are used together to determine a number of bits comprised in a second bit sequence; as illustrated in Case B, a second bit block generates a second reference bit block, and a second offset value is used together with a number of bits comprised in the second reference bit block to determine a number of bits comprised in a second bit sequence.

In Embodiment 8, when the number of HARQ-ACK bit(s) comprised in the second bit block in the present application is no greater than 2, the second bit block is used for generating a second reference bit block, the second reference bit block comprising multiple bits, a number of bits comprised in the second reference bit block (bit size of the second reference bit block) is equal to a second reference numerical value, the second reference numerical value being greater than 2, and the second offset value in the present application is used together with the second reference numerical value to determine a number of bits comprised in the second bit sequence in the present application; when the number of HARQ-ACK bits comprised in the second bit block is greater than 2, the second offset value is used together with the number of HARQ-ACK bits comprised in the second bit block to determine the number of bits comprised in the second bit sequence.

In one embodiment, the number of HARQ-ACK bit(s) comprised in the second bit block is equal to 1 or 2.

In one embodiment, the number of HARQ-ACK bits comprised in the second bit block is greater than 2.

In one embodiment, the statement that "the second bit block is used for generating a second reference bit block" in the claims includes a meaning that: the second bit block is used by the first node in the present application for generating the second reference bit block.

In one embodiment, the statement that "the second bit block is used for generating a second reference bit block" in the claims includes a meaning that: the second reference bit block is generated by the second bit block through Padding, or Extension or Repetition.

In one embodiment, the statement that "the second bit block is used for generating a second reference bit block" in the claims includes a meaning that: the second reference bit block is generated by padding "0" bit to the second bit block.

In one embodiment, the statement that "the second bit block is used for generating a second reference bit block" in the claims includes a meaning that: the second reference bit block is generated by padding "1" bit to the second bit block.

In one embodiment, the statement that "the second bit block is used for generating a second reference bit block" in the claims includes a meaning that: the second reference bit block is generated by padding the second bit block with "0" bit after a Least Significant Bit (LSB).

In one embodiment, the statement that "the second bit block is used for generating a second reference bit block" in the claims includes a meaning that: the second reference bit block is generated by padding the second bit block with "0" bit before a Most Significant Bit (MSB).

In one embodiment, the statement that "the second bit block is used for generating a second reference bit block" in the claims includes a meaning that: bits comprised in the second bit block are sequentially arranged from MSB to LSB; the second reference bit block is generated by padding the second bit block with "0" bit after a Least Significant Bit (LSB).

In one embodiment, the second reference bit block comprises 3 bits.

In one embodiment, any bit comprised in the second reference bit block is a bit obtained through UCI bit sequence generation.

In one embodiment, the second reference bit block is a HARQ-ACK bit sequence obtained through UCI bit sequence generation.

In one embodiment, the second reference bit block is a HARQ-ACK bit sequence input to Code block segmentation and code block CRC attachment.

In one embodiment, the second reference bit block is a HARQ-ACK bit sequence input to Channel Coding.

In one embodiment, any bit comprised in the second reference bit block is a bit before coding.

In one embodiment, any bit comprised in the second reference bit block is a bit not having been through channel coding.

In one embodiment, the second reference bit block comprises no CRC bit.

In one embodiment, the second reference bit block comprises a CRC bit.

In one embodiment, when the number of bits comprised in the second reference bit block is greater than 11, the second reference bit block comprises a CRC bit; otherwise, the second reference bit block comprises no CRC bit.

In one embodiment, the second reference numerical value is a positive integer.

In one embodiment, the second reference numerical value is equal to 3.

In one embodiment, the second reference numerical value is greater than 3.

In one embodiment, the second reference numerical value is fixed.

In one embodiment, the second reference numerical value is pre-defined or configured by signaling.

In one embodiment, the statement that "the second offset value is used together with the second reference numerical value to determine a number of bits comprised in the second bit sequence" in the claims includes the following meaning: the second offset value and the second reference numerical value are used together by the first node or the second node in the present application to determine a number of bits comprised in the second bit sequence.

In one embodiment, the statement that "the second offset value is used together with the second reference numerical value to determine a number of bits comprised in the second bit sequence" in the claims includes the following meaning: the second offset value and the second reference numerical value are used together to calculate a number of bits comprised in the second bit sequence.

In one embodiment, the statement that "the second offset value is used together with the second reference numerical value to determine a number of bits comprised in the second bit sequence" in the claims includes the following meaning: the second offset value and the second reference numerical value are used to calculate a number of Modulation Symbol(s) generated by the second bit sequence, which is further used for calculating a number of bits comprised in the second bit sequence.

In one embodiment, the statement that "the second offset value is used together with the second reference numerical value to determine a number of bits comprised in the second bit sequence" in the claims includes the following meaning: the second offset value and the second reference numerical value are used to calculate a number per layer of Modulation Symbol(s) generated by the second bit sequence, which is further used for calculating a number of bits comprised in the second bit sequence.

In one embodiment, the statement that "the second offset value is used together with the second reference numerical value to determine a number of bits comprised in the second bit sequence" in the claims includes the following meaning: the second offset value and the second reference numerical value are used to calculate a number per layer of Modulation Symbol(s) generated by the second bit sequence, which is further used together with a number of transmission layers and a modulation order of the target PUSCH for calculating a number of bits comprised in the second bit sequence.

In one embodiment, the statement that "the second offset value is used together with the second reference numerical value to determine a number of bits comprised in the second bit sequence" in the claims includes the following meaning: the second offset value and the second reference numerical value are used to calculate a number per layer of Modulation Symbol(s) generated by the second bit sequence, and a number of bits comprised in the second bit sequence is proportional to the number per layer of Modulation Symbol(s) generated by the second bit sequence.

In one embodiment, the statement that "the second offset value is used together with the second reference numerical value to determine a number of bits comprised in the second bit sequence" in the claims includes the following meaning: the number E2 of bits comprised in the second bit sequence meets E2=$N_L \cdot Q'_{UCI2} \cdot Q_m$, where $N_L$ represents a number of transmission layers of the target PUSCH, and $Q_m$ represents a modulation order of the target PUSCH; when the target PUSCH carries a UL-SCH, $Q'_{UCI2}$ meets the following formula:

$$Q'_{UCI2} = \min\left\{ \left\lceil \frac{(O_{UCI2\_ref} + L_{UCI2\_ref})\beta^{PUSCH}_{offset2} \cdot N^{PUSCH}_{RE}}{\sum_{r=0}^{C_{UL-SCH}-1} K_r} \right\rceil, \lceil \alpha 2 \cdot N'_{RE} \rceil \right\}$$

when the target PUSCH does not carry a UL-SCH, $Q'_{UCI2}$ meets the following formula:

$$Q'_{UCI2} = \min\left\{\left\lceil\frac{(O_{UCI2\_ref} + L_{UCI2\_ref})\beta^{PUSCH}_{offset2}}{R \cdot Q_m}\right\rceil, \lceil\alpha2 \cdot N'_{RE}\rceil\right\}$$

Herein, $O_{UCI2\_ref}$ represents the second reference numerical value; $L_{UCI2\_ref}$ represents a number of CRC bit(s) (where $L_{UCI2\_ref}$ can be equal to or greater than 0);

$$\beta^{PUSCH}_{offset2}$$

represents the second offset value;

$$N^{PUSCH}_{RE}$$

represents a number of REs occupied by the target PUSCH; $K_r$ represents a size of an r-th Uplink Shared Channel (UL-SCH) code block carried by the target PUSCH; $C_{UL-SCH}$ represents a number of UL-SCH code blocks carried by the target PUSCH; R represents a code rate of the target PUSCH; $Q_m$ represents a modulation order of the target PUSCH; α2 is a configured scale factor; $N'_{RE}$ represents a number of REs in symbol(s) occupied by the target PUSCH later than an earliest DMRS symbol.

In one embodiment, the statement that "the second offset value is used together with the number of HARQ-ACK bits comprised in the second bit block to determine the number of bits comprised in the second bit sequence" in the claims includes the following meaning: the second offset value is used together with the number of HARQ-ACK bits comprised in the second bit block by the first node or the second node in the present application to determine a number of bits comprised in the second bit sequence.

In one embodiment, the statement that "the second offset value is used together with the number of HARQ-ACK bits comprised in the second bit block to determine the number of bits comprised in the second bit sequence" in the claims includes the following meaning: the second offset value is used together with the number of HARQ-ACK bits comprised in the second bit block to calculate the number of bits comprised in the second bit sequence.

In one embodiment, the statement that "the second offset value is used together with the number of HARQ-ACK bits comprised in the second bit block to determine the number of bits comprised in the second bit sequence" in the claims includes the following meaning: the second offset value is used together with the number of HARQ-ACK bits comprised in the second bit block to calculate a number per layer of Modulation Symbol(s) generated by the second bit sequence, which is further used for calculating a number of bits comprised in the second bit sequence.

In one embodiment, the statement that "the second offset value is used together with the number of HARQ-ACK bits comprised in the second bit block to determine the number of bits comprised in the second bit sequence" in the claims includes the following meaning: the second offset value is used together with the number of HARQ-ACK bits comprised in the second bit block to calculate a number per layer of Modulation Symbol(s) generated by the second bit sequence, which is further used together with a number of transmission layers and a modulation order of the target PUSCH for calculating a number of bits comprised in the second bit sequence.

In one embodiment, the statement that "the second offset value is used together with the number of HARQ-ACK bits comprised in the second bit block to determine the number of bits comprised in the second bit sequence" in the claims includes the following meaning: the second offset value is used together with the number of HARQ-ACK bits comprised in the second bit block to calculate a number per layer of Modulation Symbol(s) generated by the second bit sequence, and a number of bits comprised in the second bit sequence is proportional to the number per layer of Modulation Symbol(s) generated by the second bit sequence.

In one embodiment, the statement that "the second offset value is used together with the number of HARQ-ACK bits comprised in the second bit block to determine the number of bits comprised in the second bit sequence" in the claims includes the following meaning: the number E2 of bits comprised in the second bit sequence meets $E2 = N_L \cdot Q'_{UCI2} \cdot Q_m$, where $N_L$ represents a number of transmission layers of the target PUSCH, and $Q_m$ represents a modulation order of the target PUSCH; when the target PUSCH carries a UL-SCH, $Q'_{UCI2}$ meets the following formula:

$$Q'_{UCI2} = \min\left\{\left\lceil\frac{(O_{UCI2} + L_{UCI2}) \cdot \beta^{PUSCH}_{offset2} \cdot N^{PUSCH}_{RE}}{\sum_{r=0}^{C_{UL-SCH}-1} K_r}\right\rceil, \lceil\alpha2 \cdot N'_{RE}\rceil\right\}$$

when the target PUSCH does not carry a UL-SCH, $Q'_{UCI2}$ meets the following formula:

$$Q'_{UCI2} = \min\left\{\left\lceil\frac{(O_{UCI2} + L_{UCI2}) \cdot \beta^{PUSCH}_{offset2}}{R \cdot Q_m}\right\rceil, \lceil\alpha2 \cdot N'_{RE}\rceil\right\}$$

Herein, $O_{UCI2}$ represents the number of HARQ-ACK bit(s) comprised in the second bit block; $L_{UCI2}$ represents a number of CRC bit(s) (where $L_{UCI2}$ can be equal to or greater than 0);

$$\beta^{PUSCH}_{offset2}$$

represents the second offset value;

$$N^{PUSCH}_{RE}$$

represents a number of REs occupied by the target PUSCH; $K_r$ represents a size of an r-th Uplink Shared Channel (UL-SCH) code block carried by the target PUSCH; $C_{UL-SCH}$ represents a number of UL-SCH code blocks carried by the target PUSCH; R represents a code rate of the target PUSCH; $Q_m$ represents a modulation order of the target PUSCH; α2 is a configured scale factor; $N'_{RE}$ represents a number of REs in symbol(s) occupied by the target PUSCH later than an earliest DMRS symbol.

In one embodiment, a number of transmission layers of the target PUSCH is also used to determine a number of bits comprised in the second bit sequence.

In one embodiment, modulation order of the target PUSCH is also used to determine a number of bits comprised in the second bit sequence.

In one embodiment, a code rate of the target PUSCH is also used to determine a number of bits comprised in the second bit sequence.

In one embodiment, a number of code blocks carried by the target PUSCH is also used to determine a number of bits comprised in the second bit sequence.

Embodiment 9

Figure 9:
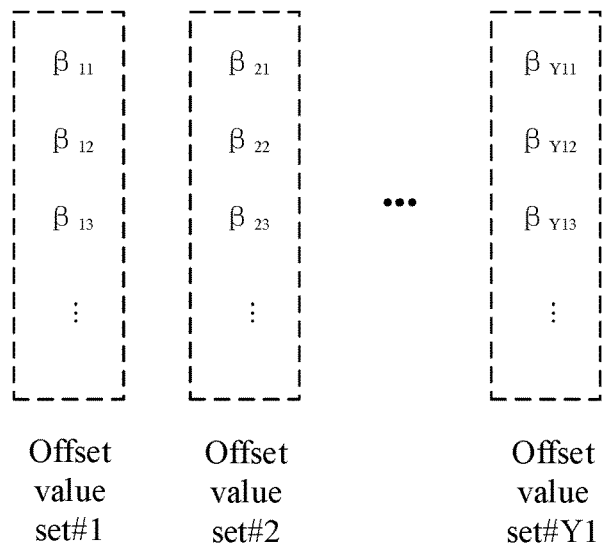
FIG. 9 illustrates a schematic diagram of Y1 offset value sets according to one embodiment of the present application.

Embodiment 9 illustrates a schematic diagram of Y1 offset value sets according to one embodiment of the present application, as shown in FIG. 9. In FIG. 9, each dotted-line box represents one of Y1 offset value sets, and each P value represents an offset value comprised in an offset value set.

In Embodiment 9, the first signaling in the present application is used to determine time-frequency resources occupied by the target PUSCH in the present application; at least one of a number of priority/priorities corresponding to HARQ-ACK bit(s) that the target PUSCH is used to carry or a relation between a priority corresponding to the first bit block in the present application and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to determine a first offset value set out of the Y1 offset value sets, and the first offset value in the present application is equal to a candidate offset value comprised in the first offset value set, the number of HARQ-ACK bit(s) comprised in the first bit block being used to determine the first offset value from the first offset value set.

In one embodiment, the statement that "the first signaling is used to determine a first offset value set out of the Y1 offset value sets" in the claims includes a meaning that: the first signaling is used by the first node in the present application to determine a first offset value set out of the Y1 offset value sets.

In one embodiment, the statement that "the first signaling is used to determine a first offset value set out of the Y1 offset value sets" in the claims includes a meaning that: one or multiple fields comprised in the first signaling is used for explicitly or implicitly indicating the first offset value set out of the Y1 offset value sets.

In one embodiment, the statement that "the first signaling is used to determine a first offset value set out of the Y1 offset value sets" in the claims includes a meaning that: one or multiple fields comprised in the first signaling is used for explicitly or implicitly indicating an index of the first offset value set among the Y1 offset value sets.

In one embodiment, any two offset value sets among the Y1 offset value sets are different.

In one embodiment, there are two offset value sets among the Y1 offset value sets being the same.

In one embodiment, any of the Y1 offset value sets comprises β offset values of HARQ-ACKs for different ranges of numbers of information bits.

In one embodiment, any of the Y1 offset value sets comprises at least 3 candidate offset values.

In one embodiment, any two offset value sets among the Y1 offset value sets comprise equal numbers of candidate offset values.

In one embodiment, any of the Y1 offset value sets comprises 6 candidate offset values.

In one embodiment, any of the Y1 offset value sets comprises 9 candidate offset values.

In one embodiment, candidate offset values comprised in any of the Y1 offset value sets are indicated by a same IE.

In one embodiment, any two candidate offset values in a same offset value set among the Y1 offset value sets are respectively β offset values for two different types of UCIs or for two different ranges of numbers of information bits.

In one embodiment, any two offset value sets among the Y1 offset value sets are indicated by a list of IEs of the same type.

In one embodiment, any of the Y1 offset value sets comprises a β offset value of CSI part 1.

In one embodiment, any of the Y1 offset value sets does not comprise a β offset value of CSI part 1.

In one embodiment, any of the Y1 offset value sets comprises a β offset value of CSI part 2.

In one embodiment, any of the Y1 offset value sets does not comprise a β offset value of CSI part 2.

In one embodiment, any of the Y1 offset value sets is configured by all or partial fields comprised in an IE "betaOffsetsCrossPri-r17".

In one embodiment, Y1 is equal to 2.

In one embodiment, Y1 is equal to 4.

In one embodiment, Y1 is configurable or pre-defined.

In one embodiment, the statement of "a relation between a priority corresponding to the first bit block and a priority corresponding to the target PUSCH" in the claims includes the following meaning: a relation between high and low of the priority corresponding to the first bit block and the priority corresponding to the target PUSCH.

In one embodiment, the statement of "a relation between a priority corresponding to the first bit block and a priority corresponding to the target PUSCH" in the claims includes the following meaning: whether the priority corresponding to the first bit block and the priority corresponding to the target PUSCH are the same.

In one embodiment, the statement of "a relation between a priority corresponding to the first bit block and a priority corresponding to the target PUSCH" in the claims includes the following meaning: whether the priority corresponding to the first bit block and the priority corresponding to the target PUSCH are the same, and a relation between high and low of the priority corresponding to the first bit block and the priority corresponding to the target PUSCH in the case that the priority corresponding to the first bit block and the priority corresponding to the target PUSCH are different.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: at least one of a number of priority/priorities corresponding to HARQ-ACK bit(s) that the target PUSCH is used to carry or a relation between a priority corresponding to the first bit block and a priority corresponding to the target PUSCH is used by the first node in the present application together with the first information block to determine Y1 offset value sets.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: a number of priority/priorities corresponding to HARQ-ACK bit(s) that the target PUSCH is used to carry and a relation between a priority corresponding to the first bit block and a priority corresponding to the target PUSCH are used together with the first information block to determine Y1 offset value sets.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: a number of priority/priorities corresponding to HARQ-ACK bit(s) that the target PUSCH is used to carry and the first information block are both used to determine Y1 offset value sets.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: a relation between a priority corresponding to the first bit block and a priority corresponding to the target PUSCH and the first information block are used to determine Y1 offset value sets.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: the first information block is used for explicitly or implicitly indicating multiple offset value set sequences, and the Y1 offset value sets belong to one of the multiple offset value set sequences, any of the multiple offset value set sequences comprising multiple offset value sets; at least one of a number of priority/priorities corresponding to HARQ-ACK bit(s) that the target PUSCH is used to carry or a relation between a priority corresponding to the first bit block and a priority corresponding to the target PUSCH is used to determine an offset value set sequence to which the Y1 offset value sets belong from the multiple offset value set sequences.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: the first information block is used for explicitly or implicitly indicating multiple offset value set sequences, and the Y1 offset value sets belong to one of the multiple offset value set sequences, any of the multiple offset value set sequences comprising multiple offset value sets; when the priority corresponding to the first bit block is higher than the priority corresponding to the target PUSCH, the offset value set sequence to which the Y1 offset value sets belong is a first offset value set sequence among the multiple offset value set sequences; when the priority corresponding to the first bit block is equal to the priority corresponding to the target PUSCH, the offset value set sequence to which the Y1 offset value sets belong is a second offset value set sequence among the multiple offset value set sequences. In one subsidiary embodiment of the above subembodiment, any two offset value set sequences among the multiple offset value set sequences are independently configured.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: the first information block is used for explicitly or implicitly indicating multiple offset value set sequences, and the Y1 offset value sets belong to one of the multiple offset value set sequences, any of the multiple offset value set sequences comprising multiple offset value sets; when the priority corresponding to the first bit block is higher than the priority corresponding to the target PUSCH, the offset value set sequence to which the Y1 offset value sets belong is a first offset value set sequence among the multiple offset value set sequences; when the priority corresponding to the first bit block is equal to the priority corresponding to the target PUSCH, a DCI format scheduling the target PUSCH is used to determine an offset value set sequence to which the Y1 offset value sets belong from the multiple offset value set sequences. In one subsidiary embodiment of the above subembodiment, any two offset value set sequences among the multiple offset value set sequences are independently configured.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: the first information block is used for explicitly or implicitly indicating multiple offset value set sequences, and the Y1 offset value sets belong to one of the multiple offset value set sequences, any of the multiple offset value set sequences comprising multiple offset value sets; when the priority corresponding to the first bit block is higher than the priority corresponding to the target PUSCH, the offset value set sequence to which the Y1 offset value sets belong is a first offset value set sequence among the multiple offset value set sequences; when the priority corresponding to the first bit block is lower than the priority corresponding to the target PUSCH, the offset value set sequence to which the Y1 offset value sets belong is a second offset value set sequence among the multiple offset value set sequences. In one subsidiary embodiment of the above subembodiment, any two offset value set sequences among the multiple offset value set sequences are independently configured.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: the first information block is used for explicitly or implicitly indicating multiple offset value set sequences, and the Y1 offset value sets belong to one of the multiple offset value set sequences, any of the multiple offset value set sequences comprising multiple offset value sets; when the priority corresponding to the first bit block is higher than the priority corresponding to the target PUSCH, the offset value set sequence to which the Y1 offset value sets belong is a first offset value set sequence among the multiple offset value set sequences; when the priority corresponding to the first bit block is equal to the priority corresponding to the target PUSCH, the offset value set sequence to which the Y1 offset value sets belong is a second offset value set sequence among the multiple offset value set sequences; when the priority corresponding to the first bit block is lower than the priority corresponding to the target PUSCH, the offset value set sequence to which the Y1 offset value sets belong is a third offset value set sequence among the multiple offset value set sequences. In one subsidiary embodiment of the above subembodiment, any two offset value set sequences among the multiple offset value set sequences are independently configured.

In one embodiment, the statement in the claims that "at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets" in the claims includes the following meaning: the first information block is used for explicitly or implicitly indicating multiple offset value set sequences, and the Y1 offset value sets belong to one of the multiple offset value set sequences, any of the multiple offset value set sequences comprising multiple offset value sets; when the number of priority/priorities corresponding to HARQ-ACK bit(s) that the target PUSCH is used to carry is equal to 0, the offset value set sequence to which the Y1 offset value sets belong is a first offset value set sequence among the multiple offset value set sequences; when the number of priority/priorities corresponding to HARQ-ACK bit(s) that the target PUSCH is used to carry is greater than 0 and the priority corresponding to the first bit block is higher than the priority corresponding to the target PUSCH, the offset value set sequence to which the Y1 offset value sets belong is a second offset value set sequence among the multiple offset value set sequences; when the number of priority/priorities corresponding to HARQ-ACK bit(s) that the target PUSCH is used to carry is greater than 0 and the priority corresponding to the first bit block is equal to the priority corresponding to the target PUSCH, the offset value set sequence to which the Y1 offset value sets belong is a third offset value set sequence among the multiple offset value set sequences. In one subsidiary embodiment of the above subembodiment, any two offset value set sequences among the multiple offset value set sequences are independently configured.

In one embodiment, a DCI format scheduling the target PUSCH is also used to determine the Y1 offset value sets.

In one embodiment, the statement in the claims that "the number of HARQ-ACK bit(s) comprised in the first bit block being used to determine the first offset value from the first offset value set" includes a meaning that: the number of HARQ-ACK bit(s) comprised in the first bit block is used by the first node in the present application to determine the first offset value from the first offset value set.

In one embodiment, the statement in the claims that "the number of HARQ-ACK bit(s) comprised in the first bit block being used to determine the first offset value from the first offset value set" includes a meaning that: multiple candidate offset values comprised in the first offset value set respectively correspond to multiple number ranges, where the first offset value corresponds to a number range among the multiple number ranges to which the number of HARQ-ACK bit(s) comprised in the first bit block belongs.

In one embodiment, the statement in the claims that "the number of HARQ-ACK bit(s) comprised in the first bit block being used to determine the first offset value from the first offset value set" includes a meaning that: the first offset value set comprises one candidate offset value corresponding to HARQ-ACK information bit(s) no greater than 2 bits, and the first offset value set comprises one candidate offset value corresponding to HARQ-ACK information bits greater than 2 bits but no greater than 11 bits, and first offset value set comprises one candidate offset value corresponding to HARQ-ACK information bits greater than 11 bits, where the first offset value is a candidate offset value comprised in the first offset value set that corresponds to the number of HARQ-ACK bit(s) comprised in the first bit block.

In one embodiment, the statement in the claims that "the number of HARQ-ACK bit(s) comprised in the first bit block being used to determine the first offset value from the first offset value set" includes a meaning that: when the number of HARQ-ACK bit(s) comprised in the first bit block is no greater than 2, the first offset value is equal to a first candidate offset value comprised in the first offset value set; when the number of HARQ-ACK bit(s) comprised in the first bit block is greater than 2 but is no greater than 11, the first offset value is equal to a second candidate offset value comprised in the first offset value set; when the number of HARQ-ACK bit(s) comprised in the first bit block is greater than 11, the first offset value is equal to a third candidate offset value comprised in the first offset value set.

Embodiment 10

Figure 10:
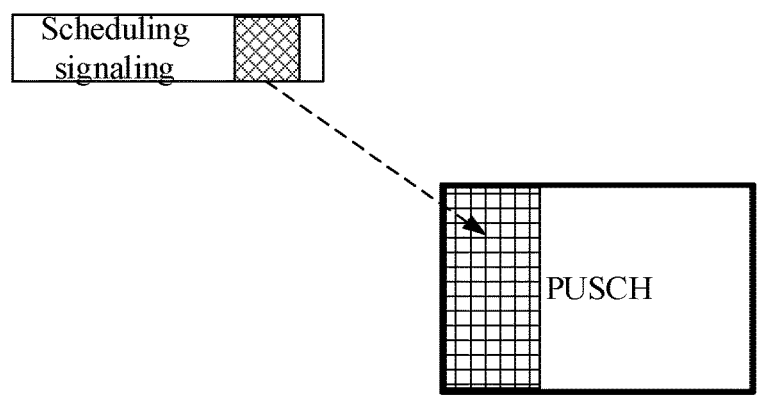
FIG. 10 illustrates a schematic diagram of a first field according to one embodiment of the present application.

Embodiment 10 illustrates a schematic diagram of a first field according to one embodiment of the present application, as shown in FIG. 10. In FIG. 10, the rectangle filled with crosses represents a first field, and the zone filled with reticles represents low-priority HARQ-ACK carried by the target PUSCH.

In Embodiment 10, a scheduling signaling of the target PUSCH in the present application comprises a first field, where value of the first field is a non-negative integer; when a number of priorities corresponding to HARQ-ACK bits that the target PUSCH is used to carry is greater than 1, the value of the first field is used to determine a number of HARQ-ACK bit(s) corresponding to low priority that the target PUSCH is used to carry.

In one embodiment, the scheduling signaling of the target PUSCH is the first signaling in the present application.

In one embodiment, the scheduling signaling of the target PUSCH includes the first information block.

In one embodiment, the scheduling signaling of the target PUSCH is a signaling other than the first signaling in the present application.

In one embodiment, the scheduling signaling of the target PUSCH does not include the first information block.

In one embodiment, the scheduling signaling of the target PUSCH is a DCI format scheduling the target PUSCH.

In one embodiment, the scheduling signaling of the target PUSCH is a DCI format carried by a Physical Downlink Control Channel (PDCCH) scheduling the target PUSCH.

In one embodiment, the scheduling signaling of the target PUSCH is used for allocating or configuring at least one of time-frequency resources occupied by the target PUSCH, a Modulation Coding Scheme (MCS) adopted by the target PUSCH or a Redundancy Version (RV) corresponding to the target PUSCH.

In one embodiment, the first field is a Downlink Assignment Index (DAI) field.

In one embodiment, the first field is a first DAI field.

In one embodiment, the first field is a second DAI field.

In one embodiment, the first field is a third DAI field.

In one embodiment, the first field is a field other than the DAI field.

In one embodiment, the statement in the claims that "the value of the first field is used to determine a number of HARQ-ACK bit(s) corresponding to low priority that the target PUSCH is used to carry" includes the following meaning: the value of the first field is used by the first node in the present application to determine the number of HARQ-ACK bit(s) corresponding to low priority that the target PUSCH is used to carry.

In one embodiment, the statement in the claims that "the value of the first field is used to determine a number of HARQ-ACK bit(s) corresponding to low priority that the target PUSCH is used to carry" includes the following meaning: the value of the first field is used for explicitly or implicitly indicating the number of HARQ-ACK bit(s) corresponding to low priority that the target PUSCH is used to carry.

In one embodiment, the statement in the claims that "the value of the first field is used to determine a number of HARQ-ACK bit(s) corresponding to low priority that the target PUSCH is used to carry" includes the following meaning: the value of the first field is equal to one of K1 candidate integers, K1 being a positive integer greater than 1; a remainder yielded by the number of HARQ-ACK bit(s) corresponding to low priority that the target PUSCH is used to carry being divided by the K1 is equal to the value of the first field.

In one embodiment, the statement in the claims that "the value of the first field is used to determine a number of HARQ-ACK bit(s) corresponding to low priority that the target PUSCH is used to carry" includes the following meaning: the value of the first field is equal to one of K1 candidate integers, K1 being a positive integer greater than 1; the value of the first field is used to determine a remainder yielded by the number of HARQ-ACK bit(s) corresponding to low priority that the target PUSCH is used to carry being divided by the K1. In one subsidiary embodiment of the above embodiment, the bitwidth of the first field is used to determine the K1 candidate integers; the bitwidth of the first field is pre-defined, or the bitwidth of the first field is configured by signaling.

In one embodiment, the statement in the claims that "the value of the first field is used to determine a number of HARQ-ACK bit(s) corresponding to low priority that the target PUSCH is used to carry" includes the following meaning: the value of the first field is equal to one of K1 candidate integers, K1 being a positive integer greater than 1; a remainder yielded by the number of HARQ-ACK bit(s) corresponding to low priority that the target PUSCH is used to carry being divided by the K1 further increased by 1 is equal to the value of the first field.

In one embodiment, a scheduling signaling of the target PUSCH comprises a second field, where value of the second field is a non-negative integer and the value is equal to one of W1 candidate values, W1 being a positive integer greater than 1; any of the W1 candidate values is a non-negative integer, and a first reference value is one of the W1 candidate values, whether the value of the second field is equal to the first reference value is used to determine whether the target PUSCH is used for carrying HARQ-ACK bits corresponding to different priorities. In one subsidiary embodiment of the above embodiment, the second field is a DAI field. In one subsidiary embodiment of the above embodiment, the second field is a UL DAI field. In one subsidiary embodiment of the above embodiment, the second field is different from the first field. In one subsidiary embodiment of the above embodiment, the second field is a field used for indicating a β(Beta) offset.

Embodiment 11

Figure 11:
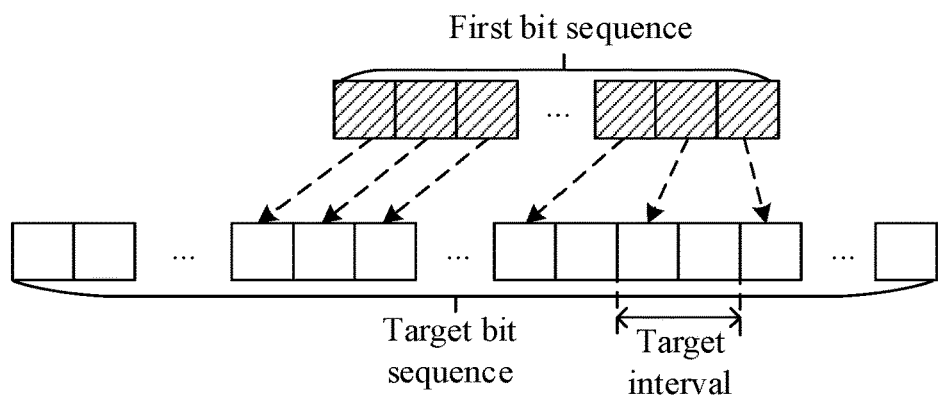
FIG. 11 illustrates a schematic diagram illustrating a relation between a first bit sequence and a target bit sequence according to one embodiment of the present application.

Embodiment 11 illustrates a schematic diagram illustrating a relation between a first bit sequence and a target bit sequence according to one embodiment of the present application, as shown in FIG. 11. In FIG. 11, each small box filled with slashes represents one bit in a first bit sequence, and each small blank box represents one bit in a target bit sequence.

In Embodiment 11, the number of HARQ-ACK bit(s) comprised in the first bit block in the present application is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence in the present application.

In one embodiment, when the number of HARQ-ACK bit(s) comprised in the first bit block is equal to 0, the first reference bit block is multiplexed on the target PUSCH or the first bit block is not multiplexed on the target PUSCH.

In one embodiment, when the number of HARQ-ACK bit(s) comprised in the first bit block is equal to 0 and the target condition is satisfied, the first reference bit block is multiplexed on the target PUSCH; otherwise, the first reference bit block is not multiplexed on the target PUSCH.

In one embodiment, when the number of HARQ-ACK bit(s) comprised in the first bit block is equal to 0 and the target PUSCH is not used for carrying any HARQ-ACK bit other than the first bit block, and the target condition is satisfied, the first reference bit block is multiplexed on the target PUSCH; otherwise, the first reference bit block is not multiplexed on the target PUSCH.

In one embodiment, the statement in the claims that "the number of HARQ-ACK bit(s) comprised in the first bit block is used to determine an order of the first bit block being multiplexed onto the target PUSCH" includes a meaning that: when the number of HARQ-ACK bit(s) comprised in the first bit block is greater than 0, the number of HARQ-ACK bit(s) comprised in the first bit block is used to determine an order of the first bit block being multiplexed onto the target PUSCH.

In one embodiment, the statement in the claims that "the number of HARQ-ACK bit(s) comprised in the first bit block is used to determine an order of the first bit block being multiplexed onto the target PUSCH" includes a meaning that: the number of HARQ-ACK bit(s) comprised in the first bit block is used by the first node or the second node in the present application to determine an order of the first bit block being multiplexed onto the target PUSCH.

In one embodiment, the statement in the claims that "the number of HARQ-ACK bit(s) comprised in the first bit block is used to determine an order of the first bit block being multiplexed onto the target PUSCH" includes a meaning that: the number of HARQ-ACK bit(s) comprised in the first bit block is used to determine steps of how the first bit block is multiplexed onto the target PUSCH.

In one embodiment, the statement in the claims that "the number of HARQ-ACK bit(s) comprised in the first bit block is used to determine an order of the first bit block being multiplexed onto the target PUSCH" includes a meaning that: the number of HARQ-ACK bit(s) comprised in the first bit block is used to determine an order and steps of how the first bit sequence is used for generating the target bit sequence.

In one embodiment, the statement in the claims that "the number of HARQ-ACK bit(s) comprised in the first bit block is used to determine an order of the first bit block being multiplexed onto the target PUSCH" includes a meaning that: the number of HARQ-ACK bit(s) comprised in the first bit block is used to determine an order and steps of how bit(s) comprised in the first bit sequence is(are) added or assigned to the target bit sequence.

In one embodiment, the statement in the claims that "the number of HARQ-ACK bit(s) comprised in the first bit block is used to determine an order of the first bit block being multiplexed onto the target PUSCH" includes a meaning that: when the number of HARQ-ACK bit(s) comprised in the first bit block is no greater than 2, the first bit block being multiplexed onto the target PUSCH belongs to step 5 of Data and control multiplexing; when the number of HARQ-ACK bit(s) comprised in the first bit block is greater than 2, the first bit block being multiplexed onto the target PUSCH belongs to step 2 of Data and control multiplexing.

In one embodiment, the statement in the claims that "the number of HARQ-ACK bit(s) comprised in the first bit block is used to determine an order of the first bit block being multiplexed onto the target PUSCH" includes a meaning that: when the number of HARQ-ACK bit(s) comprised in the first bit block is no greater than 2, the first bit block is multiplexed onto the target PUSCH using step 5 of Data and control multiplexing; when the number of HARQ-ACK bit(s) comprised in the first bit block is greater than 2, the first bit block is multiplexed onto the target PUSCH using step 2 of Data and control multiplexing.

In one embodiment, the statement in the claims that "the number of HARQ-ACK bit(s) comprised in the first bit block is used to determine an order of the first bit block being multiplexed onto the target PUSCH" includes a meaning that: when the number of HARQ-ACK bit(s) comprised in the first bit block is no greater than 2, the first bit block being multiplexed onto the target PUSCH belongs to step 1 and 5 of Data and control multiplexing; when the number of HARQ-ACK bit(s) comprised in the first bit block is greater than 2, the first bit block being multiplexed onto the target PUSCH belongs to step 2 of Data and control multiplexing.

In one embodiment, the statement in the claims that "the number of HARQ-ACK bit(s) comprised in the first bit block is used to determine an order of the first bit block being multiplexed onto the target PUSCH" includes a meaning that: when the number of HARQ-ACK bit(s) comprised in the first bit block is no greater than 2, the first bit block is multiplexed onto the target PUSCH using step 1 and 5 of Data and control multiplexing; when the number of HARQ-ACK bit(s) comprised in the first bit block is greater than 2, the first bit block is multiplexed onto the target PUSCH using step 2 of Data and control multiplexing.

In one embodiment, the target interval can be equal to 1.

In one embodiment, the target interval is greater than 1.

In one embodiment, the statement that "the number of bits comprised in the first bit sequence is used to determine a target interval" in the claims includes the following meaning: the number of bits comprised in the first bit sequence is used by the first node or the second node in the present application to determine a target interval.

In one embodiment, the statement that "the number of bits comprised in the first bit sequence is used to determine a target interval" in the claims includes the following meaning: the number of bits comprised in the first bit sequence is used for calculating the target interval.

In one embodiment, the statement that "the number of bits comprised in the first bit sequence is used to determine a target interval" in the claims includes the following meaning: a remaining number being equal to the number of bits comprised in the first bit sequence, a modulation order of an MCS adopted by the target PUSCH and a number of subcarriers occupied by the target PUSCH in a time-domain symbol are used together to determine the target interval.

In one embodiment, the statement that "the number of bits comprised in the first bit sequence is used to determine a target interval" in the claims includes the following meaning: a remaining number is equal to a difference between a number of bits comprised in the first bit sequence and a first intermediate number, the first intermediate number being equal to a number of bits in the first bit sequence mapped in a time-domain symbol before a last time-domain symbol occupied by the first bit sequence; a comparative number is equal to a product of a largest number of REs that the first bit sequence can occupy in a last occupied time-domain symbol, a modulation order of the target PUSCH and a number of layers of the target PUSCH; when the remaining number is no smaller than the comparative number, the target interval is equal to 1; when the remaining number is smaller than the comparative number, the target interval is equal to a ratio of the comparative number to the remaining number being rounded down to a nearest integer.

In one embodiment, the statement that "the number of bits comprised in the first bit sequence is used to determine a target interval" is implemented on condition that the target interval d meets the following formula.

$$d = \begin{cases} 1, & \text{if } G^{ACK}(i) - m_{count}^{ACK}(i) \geq \overline{M}_{SC}^{UCI}(l) \cdot N_L \cdot Q_m \\ \lfloor \overline{M}_{SC}^{UCI}(l) \cdot N_L \cdot Q_m / (G^{ACK}(i) - m_{count}^{ACK}(i)) \rfloor, & \text{otherwise} \end{cases}$$

Herein, $$\overline{M}_{SC}^{UCL}(l)$$

represents the largest number of REs that the first bit sequence can occupy in a last occupied time-domain symbol; $N_L$ represents a number of layers of the target PUSCH; and $Q_m$ represents a modulation order of the target PUSCH; $G^{ACK}(i)$ represents a number of bits comprised in the first bit sequence;

$$m_{count}^{ACK}(i)$$

represents a number of bits in the first bit sequence mapped in a time-domain symbol before a last time-domain symbol occupied by the first bit sequence.

In one embodiment, a Modulation Order of the target PUSCH and a number of layers of the target PUSCH are used to determine the target interval.

In one embodiment, a product of a Modulation Order of the target PUSCH and a number of layers of the target PUSCH is used to determine the target interval.

In one embodiment, the statement in the claims of "distribution of the bits comprised in the first bit sequence in the target bit sequence" includes: the distribution of indexes for the bits comprised in the first bit sequence in the target bit sequence.

In one embodiment, the statement in the claims of "distribution of the bits comprised in the first bit sequence in the target bit sequence" includes: the pattern of indexes for the bits comprised in the first bit sequence in the target bit sequence.

In one embodiment, the statement in the claims of "distribution of the bits comprised in the first bit sequence in the target bit sequence" includes: a difference between indexes for two bits comprised in the first bit sequence in the target bit sequence.

In one embodiment, the statement in the claims of "distribution of the bits comprised in the first bit sequence in the target bit sequence" includes: an index for each bit comprised in the first bit sequence in the target bit sequence.

In one embodiment, the statement in the claims of "distribution of the bits comprised in the first bit sequence in the target bit sequence" includes: the distribution of REs occupied or mapped by the first bit sequence among all REs occupied by the target PUSCH.

In one embodiment, the statement in the claims of "distribution of the bits comprised in the first bit sequence in the target bit sequence" includes: the distribution of REs occupied or mapped in a time-domain symbol by the first bit sequence in frequency domain.

In one embodiment, the statement in the claims of "distribution of the bits comprised in the first bit sequence in the target bit sequence" includes: the distribution in frequency domain or a frequency-domain interval of REs occupied or mapped by the first bit sequence in a last time-domain symbol occupied by the first bit sequence.

In one embodiment, the statement in the claims of "distribution of the bits comprised in the first bit sequence in the target bit sequence" includes: a number of subcarrier(s) between any two of REs occupied or mapped by the first bit sequence in a last time-domain symbol occupied by the first bit sequence in frequency domain.

In one embodiment, the statement in the claims of "distribution of the bits comprised in the first bit sequence in the target bit sequence" includes: the distribution of indexes for bits comprised in the first bit sequence which are mapped or multiplexed in time domain on a last time-domain symbol mapped by the first bit sequence in the target bit sequence.

In one embodiment, the statement in the claims of "the target interval being used to determine a distribution of the bits comprised in the first bit sequence in the target bit sequence" includes: the target interval is used by the first node or the second node in the present application to determine the distribution of the bits comprised in the first bit sequence in the target bit sequence.

In one embodiment, the statement in the claims of "the target interval being used to determine a distribution of the bits comprised in the first bit sequence in the target bit sequence" includes: a difference between indexes for two bits comprised in the first bit sequence that are mapped or multiplexed in time domain onto a last mapped time-domain symbol in the target bit sequence is equal to the target interval.

In one embodiment, the statement in the claims of "the target interval being used to determine a distribution of the bits comprised in the first bit sequence in the target bit sequence" includes: a maximum value of a difference between indexes for any two bits comprised in the first bit sequence that are mapped or multiplexed in time domain onto a last mapped time-domain symbol in the target bit sequence is equal to the target interval.

In one embodiment, the statement in the claims of "the target interval being used to determine a distribution of the bits comprised in the first bit sequence in the target bit sequence" includes: a difference between indexes for two bits with adjacent indexes comprised in the first bit sequence that are mapped or multiplexed in time domain onto a last mapped time-domain symbol in the target bit sequence is equal to the target interval.

In one embodiment, the statement in the claims of "the target interval being used to determine a distribution of the bits comprised in the first bit sequence in the target bit sequence" includes: the target interval is used for calculating a difference between indexes for two bits comprised in the first bit sequence that are mapped or multiplexed in time domain onto a last mapped time-domain symbol in the target bit sequence.

In one embodiment, the statement in the claims of "the target interval being used to determine a distribution of the bits comprised in the first bit sequence in the target bit sequence" includes: the target interval is used to determine the distribution of REs occupied by the first bit sequence among all REs occupied by the target PUSCH; the distribution of REs occupied by the first bit sequence among all REs occupied by the target PUSCH is used to determine distribution of bits comprised in the first bit sequence in the target bit sequence.

In one embodiment, the statement in the claims of "the target interval being used to determine a distribution of the bits comprised in the first bit sequence in the target bit sequence" includes: the target interval is used to determine distribution of REs occupied by the first bit sequence on a last time-domain symbol mapped by the first bit sequence in frequency domain; the distribution of REs occupied by the first bit sequence on a last time-domain symbol mapped by the first bit sequence in frequency domain is used to determine distribution of bits comprised in the first bit sequence in the target bit sequence.

In one embodiment, the statement in the claims of "the target interval being used to determine a distribution of the bits comprised in the first bit sequence in the target bit sequence" includes: the target interval is equal to a number of subcarrier(s) between any two of REs occupied by the first bit sequence in a last time-domain symbol mapped by the first bit sequence in frequency domain.

In one embodiment, the statement in the claims of "the target interval being used to determine a distribution of the bits comprised in the first bit sequence in the target bit sequence" includes: the target interval is equal to a number of subcarrier(s) between any two of REs occupied or mapped by the first bit sequence in a last time-domain symbol mapped by the first bit sequence in frequency domain; modulation symbols generated by the target bit sequence are sequentially mapped onto REs for scheduling the target PUSCH first in frequency and then in time domain.

Embodiment 12

Figure 12:
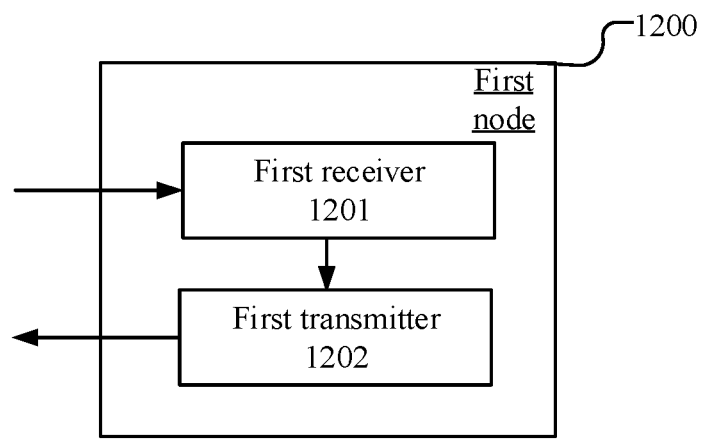
FIG. 12 illustrates a structure block diagram of a processing device in a first node according to one embodiment of the present application.

Embodiment 12 illustrates a structure block diagram of a processing device in a first node in an example, as shown in FIG. 12. In FIG. 12, a processing device 1200 in a first node is comprised of a first receiver 1201 and a first transmitter 1202. The first receiver 1201 comprises the transmitter/receiver 456 (comprising the antenna 460), the receiving processor 452 and the controller/processor 490 in FIG. 4 of the present application; the first transmitter 1202 comprises the transmitter/receiver 456 (comprising the antenna 460), the transmitting processor 455 and the controller/processor 490 in FIG. 4 of the present application.

In Embodiment 12, the first receiver 1201 receives a first information block, the first information block being used to determine a first offset value, the first offset value being a non-negative number; and the first transmitter 1202 determines a first bit block and transmits a target PUSCH, where a target bit sequence is used for generating the target PUSCH, the target bit sequence comprising multiple sequentially indexed bits; herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, when the number of priority/priorities corresponding to HARQ-ACK(s) that the target PUSCH is used to carry is no greater than 1, the target condition is a first condition; when the number of priorities corresponding to HARQ-ACKs that the target PUSCH is used to carry is equal to 2, the target condition is a second condition; the first condition is one of the X1 candidate conditions, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

In one embodiment, the first information block is used to determine a second offset value, and the target PUSCH is used for carrying a second bit block, the second bit block comprising at least one HARQ-ACK bit; the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value is used together with a first reference numerical value to determine a number of RE(s) comprised in the first time-frequency resource block; a number of bits comprised in the first reference bit block (bit size of the first reference bit block) is equal to the first reference numerical value; when the number of HARQ-ACK bit(s) comprised in the first bit block is no greater than 2, any RE mapped by a modulation symbol generated by the second bit sequence is orthogonal with the first time-frequency resource block.

In one embodiment, when the number of HARQ-ACK bit(s) comprised in the second bit block is no greater than 2, the second bit block is used for generating a second reference bit block, the second reference bit block comprising multiple bits, a number of bits comprised in the second reference bit block (bit size of the second reference bit block) is equal to a second reference numerical value, the second reference numerical value being greater than 2, and the second offset value is used together with the second reference numerical value to determine a number of bits comprised in the second bit sequence; when the number of HARQ-ACK bits comprised in the second bit block is greater than 2, the second offset value is used together with the number of HARQ-ACK bits comprised in the second bit block to determine the number of bits comprised in the second bit sequence.

In one embodiment, the first receiver 1201 receives a first signaling, where the first signaling is used to determine time-frequency resources occupied by the target PUSCH; at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to determine a first offset value set out of the Y1 offset value sets, and the first offset value is equal to a candidate offset value comprised in the first offset value set, the number of HARQ-ACK bit(s) comprised in the first bit block being used to determine the first offset value from the first offset value set.

In one embodiment, a scheduling signaling of the target PUSCH comprises a first field, where a value of the first field is a non-negative integer; when a number of priorities corresponding to HARQ-ACK bits that the target PUSCH is used to carry is greater than 1, the value of the first field is used to determine a number of HARQ-ACK bit(s) corresponding to low priority that the target PUSCH is used to carry.

In one embodiment, the number of HARQ-ACK bit(s) comprised in the first bit block is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence.

Embodiment 13

Figure 13:
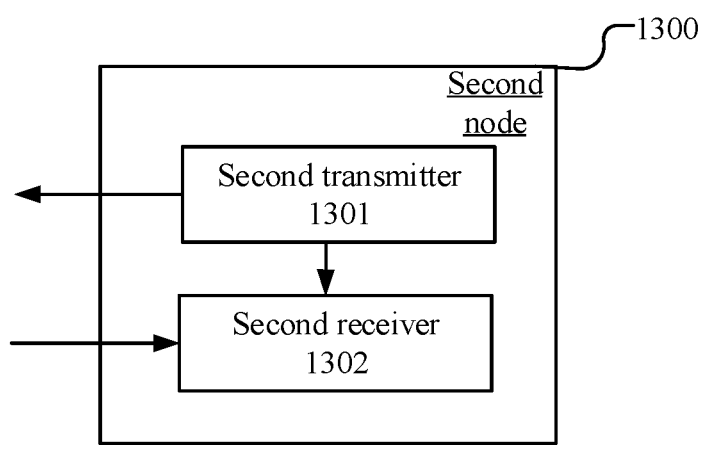
FIG. 13 illustrates a structure block diagram a processing device in a second node according to one embodiment of the present application.

Embodiment 13 illustrates a structure block diagram of a processing device in a second node in an example, as shown in FIG. 13. In FIG. 13, a processing device 1300 in a second node is comprised of a second transmitter 1301 and a second receiver 1302. The second transmitter 1301 comprises the transmitter/receiver 416 (comprising the antenna 460), the transmitting processor 415 and the controller/processor 440 in FIG. 4 of the present application; the second receiver 1302 comprises the transmitter/receiver 416 (comprising the antenna 460), the receiving processor 412 and the controller/processor 440 in FIG. 4 of the present application.

In Embodiment 13, the second transmitter 1301 transmits a first information block, the first information block being used to indicate a first offset value, the first offset value being a non-negative number; and the second receiver 1302 receives a target PUSCH and determines a first bit block, where a target bit sequence is used for generating the target PUSCH, the target bit sequence comprising multiple sequentially indexed bits; herein, the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, a number of priority/priorities corresponding to HARQ-ACK(s) that the target PUSCH is used to carry is used to determine the target condition out of the X1 candidate conditions.

In one embodiment, when the number of priority/priorities corresponding to HARQ-ACK(s) that the target PUSCH is used to carry is no greater than 1, the target condition is a first condition; when the number of priorities corresponding to HARQ-ACKs that the target PUSCH is used to carry is equal to 2, the target condition is a second condition; the first condition is one of the X1 candidate conditions, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

In one embodiment, the first information block is used to indicate a second offset value, and the target PUSCH is used for carrying a second bit block, the second bit block comprising at least one HARQ-ACK bit; the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value is used together with a first reference numerical value to determine a number of RE(s) comprised in the first time-frequency resource block; a number of bits comprised in the first reference bit block (bit size of the first reference bit block) is equal to the first reference numerical value; when the number of HARQ-ACK bit(s) comprised in the first bit block is no greater than 2, any RE mapped by a modulation symbol generated by the second bit sequence is orthogonal with the first time-frequency resource block.

In one embodiment, when the number of HARQ-ACK bit(s) comprised in the second bit block is no greater than 2, the second bit block is used for generating a second reference bit block, the second reference bit block comprising multiple bits, a number of bits comprised in the second reference bit block (bit size of the second reference bit block) is equal to a second reference numerical value, the second reference numerical value being greater than 2, and the second offset value is used together with the second reference numerical value to determine a number of bits comprised in the second bit sequence; when the number of HARQ-ACK bits comprised in the second bit block is greater than 2, the second offset value is used together with the number of HARQ-ACK bits comprised in the second bit block to determine the number of bits comprised in the second bit sequence.

In one embodiment, the second transmitter 1301 transmits a first signaling; herein, the first signaling is used to indicate time-frequency resources occupied by the target PUSCH; at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to indicate a first offset value set out of the Y1 offset value sets, and the first offset value is equal to a candidate offset value comprised in the first offset value set, the number of HARQ-ACK bit(s) comprised in the first bit block being used to determine the first offset value from the first offset value set.

In one embodiment, a scheduling signaling of the target PUSCH comprises a first field, where a value of the first field is a non-negative integer; when a number of priorities corresponding to HARQ-ACK bits that the target PUSCH is used to carry is greater than 1, the value of the first field is used to indicate a number of HARQ-ACK bit(s) corresponding to low priority that the target PUSCH is used to carry.

In one embodiment, the number of HARQ-ACK bit(s) comprised in the first bit block is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts, test equipment or test instrument, and other radio communication equipment, etc. The base station in the present application includes but is not limited to macro-cellular base stations, micro-cellular base stations, home base stations, relay base station, eNB, gNB, Transmitter Receiver Point (TRP), relay satellite, satellite base station, airborne base station, test apparatus, test equipment or test instrument, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver, receiving a first information block, the first information block being used to determine a first offset value, the first offset value being a non-negative number; and
a first transmitter, determining a first bit block and transmitting a target PUSCH, where a target bit sequence is used for generating the target PUSCH, the target bit sequence comprising multiple sequentially indexed bits;
wherein the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, whether the target PUSCH is used to carry different priorities of HARQ-ACK is used to determine the target condition out of the X1 candidate conditions.

2. The first node according to claim 1, wherein when the number of priority/priorities corresponding to HARQ-ACK(s) that the target PUSCH is used to carry is no greater than 1, the target condition is a first condition; when the number of priorities corresponding to HARQ-ACKs that the target PUSCH is used to carry is equal to 2, the target condition is a second condition; the first condition is one of the X1 candidate conditions, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

3. The first node according to claim 1, wherein the first information block is used to determine a second offset value, and the target PUSCH is used for carrying a second bit block, the second bit block comprising at least one HARQ-ACK bit; the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value is used together with a first reference numerical value to determine a number of RE(s) comprised in the first time-frequency resource block; a number of bits comprised in the first reference bit block (bit size of the first reference bit block) is equal to the first reference numerical value; when the number of HARQ-ACK bit(s) comprised in the first bit block is no greater than 2, any RE mapped by a modulation symbol generated by the second bit sequence is orthogonal with the first time-frequency resource block.

4. The first node according to claim 3, wherein when the number of HARQ-ACK bit(s) comprised in the second bit block is no greater than 2, the second bit block is used for generating a second reference bit block, the second reference bit block comprising multiple bits, a number of bits comprised in the second reference bit block (bit size of the second reference bit block) is equal to a second reference numerical value, the second reference numerical value being greater than 2, and the second offset value is used together with the second reference numerical value to determine a number of bits comprised in the second bit sequence; when the number of HARQ-ACK bits comprised in the second bit block is greater than 2, the second offset value is used together with the number of HARQ-ACK bits comprised in the second bit block to determine the number of bits comprised in the second bit sequence.

5. The first node according to claim 1, wherein the first receiver receives a first signaling, where the first signaling is used to determine time-frequency resources occupied by the target PUSCH; at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to determine a first offset value set out of the Y1 offset value sets, and the first offset value is equal to a candidate offset value comprised in the first offset value set, the number of HARQ-ACK bit(s) comprised in the first bit block being used to determine the first offset value from the first offset value set.

6. The first node according to claim 1, wherein a scheduling signaling of the target PUSCH comprises a first field, where a value of the first field is a non-negative integer; when a number of priorities corresponding to HARQ-ACK bits that the target PUSCH is used to carry is greater than 1, the value of the first field is used to determine a number of HARQ-ACK bit(s) corresponding to low priority that the target PUSCH is used to carry.

7. The first node according to claim 1, wherein the number of HARQ-ACK bit(s) comprised in the first bit block is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence.

8. A second node for wireless communications, comprising:
a second transmitter, transmitting a first information block, the first information block being used to indicate a first offset value, the first offset value being a non-negative number; and a second receiver, receiving a target PUSCH and determining a first bit block, where a target bit sequence is used for generating the target PUSCH, the target bit sequence comprising multiple sequentially indexed bits;

wherein the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, whether the target PUSCH is used to carry different priorities of HARQ-ACK is used to determine the target condition out of the X1 candidate conditions.

9. The second node according to claim 8, wherein when the number of priority/priorities corresponding to HARQ-ACK(s) that the target PUSCH is used to carry is no greater than 1, the target condition is a first condition; when the number of priorities corresponding to HARQ-ACKs that the target PUSCH is used to carry is equal to 2, the target condition is a second condition; the first condition is one of the X1 candidate conditions, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

10. The second node according to claim 8, wherein the first information block is used to determine a second offset value, and the target PUSCH is used for carrying a second bit block, the second bit block comprising at least one HARQ-ACK bit; the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value is used together with a first reference numerical value to determine a number of RE(s) comprised in the first time-frequency resource block; a number of bits comprised in the first reference bit block (bit size of the first reference bit block) is equal to the first reference numerical value; when the number of HARQ-ACK bit(s) comprised in the first bit block is no greater than 2, any RE mapped by a modulation symbol generated by the second bit sequence is orthogonal with the first time-frequency resource block.

11. The second node according to claim 8, wherein the second transmitter transmits a first signaling, where the first signaling is used to determine time-frequency resources occupied by the target PUSCH; at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to determine a first offset value set out of the Y1 offset value sets, and the first offset value is equal to a candidate offset value comprised in the first offset value set, the number of HARQ-ACK bit(s) comprised in the first bit block being used to determine the first offset value from the first offset value set.

12. The second node according to claim 8, wherein a scheduling signaling of the target PUSCH comprises a first field, where a value of the first field is a non-negative integer; when a number of priorities corresponding to HARQ-ACK bits that the target PUSCH is used to carry is greater than 1, the value of the first field is used to determine a number of HARQ-ACK bit(s) corresponding to low priority that the target PUSCH is used to carry.

13. The second node according to claim 8, wherein the number of HARQ-ACK bit(s) comprised in the first bit block is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence.

14. A method in a first node for wireless communications, comprising:
  receiving a first information block, the first information block being used to determine a first offset value, the first offset value being a non-negative number; and
  determining a first bit block and transmitting a target PUSCH, where a target bit sequence is used for generating the target PUSCH, the target bit sequence comprising multiple sequentially indexed bits;
  wherein the first bit block comprises a non-negative integer number of HARQ-ACK bit(s), and the first bit block is used for generating a first reference bit block, the first reference bit block comprising multiple bits; the first reference bit block is used for generating a first bit sequence, the first bit sequence comprising multiple sequentially indexed bits, and any bit comprised in the first bit sequence belonging to the target bit sequence, the first offset value is used to determine a number of bits comprised in the first bit sequence; when a target condition is satisfied, the number of HARQ-ACK bit(s) comprised in the first bit block is used to determine whether the first reference bit block comprises a bit other than the first bit block; when the target condition is not satisfied, the first reference bit block and the first bit block are the same; the target condition is one of X1 candidate conditions, where X1 is a positive integer greater than 1, whether the target PUSCH is used to carry different priorities of HARQ-ACK is used to determine the target condition out of the X1 candidate conditions.

15. The method in the first node according to claim 14, wherein when the number of priority/priorities corresponding to HARQ-ACK(s) that the target PUSCH is used to carry is no greater than 1, the target condition is a first condition; when the number of priorities corresponding to HARQ-ACKs that the target PUSCH is used to carry is equal to 2, the target condition is a second condition; the first condition is one of the X1 candidate conditions, and the second condition is one of the X1 candidate conditions, the first condition comprises that the target PUSCH is not used for carrying a UL-SCH and that the target PUSCH is used for carrying CSI part 1 rather than CSI part 2, while the second condition comprises that the target PUSCH is not used for carrying any information bit other than the HARQ-ACK(s).

16. The method in the first node according to claim 14, wherein the first information block is used to determine a second offset value, and the target PUSCH is used for carrying a second bit block, the second bit block comprising at least one HARQ-ACK bit; the second bit block is used for generating a second bit sequence, the second bit sequence comprising multiple sequentially indexed bits, and any bit comprised in the second bit sequence belonging to the target bit sequence; a first time-frequency resource block is reserved for HARQ-ACK(s), and the first time-frequency resource block comprises at least one RE, at least one of the first offset value or the second offset value is used together with a first reference numerical value to determine a number of RE(s) comprised in the first time-frequency resource block; a number of bits comprised in the first reference bit block (bit size of the first reference bit block) is equal to the first reference numerical value; when the number of HARQ-ACK bit(s) comprised in the first bit block is no greater than 2, any RE mapped by a modulation symbol generated by the second bit sequence is orthogonal with the first time-frequency resource block.

17. The method in the first node according to claim 16, wherein when the number of HARQ-ACK bit(s) comprised in the second bit block is no greater than 2, the second bit block is used for generating a second reference bit block, the second reference bit block comprising multiple bits, a number of bits comprised in the second reference bit block (bit size of the second reference bit block) is equal to a second reference numerical value, the second reference numerical value being greater than 2, and the second offset value is used together with the second reference numerical value to determine a number of bits comprised in the second bit sequence; when the number of HARQ-ACK bits comprised in the second bit block is greater than 2, the second offset value is used together with the number of HARQ-ACK bits comprised in the second bit block to determine the number of bits comprised in the second bit sequence.

18. The method in the first node according to claim 14, comprising:
receiving a first signaling;
wherein the first signaling is used to determine time-frequency resources occupied by the target PUSCH; at least one of a number of priority/priorities corresponding to HARQ-ACK bit(s) that the target PUSCH is used to carry or a relation between a priority corresponding to the first bit block and a priority corresponding to the target PUSCH is used together with the first information block to determine Y1 offset value sets; any of the Y1 offset value sets comprises multiple candidate offset values, and any candidate offset value comprised in any of the Y1 offset value sets is a non-negative number, Y1 being a positive integer greater than 1; the first signaling is used to determine a first offset value set out of the Y1 offset value sets, and the first offset value is equal to a candidate offset value comprised in the first offset value set, the number of HARQ-ACK bit(s) comprised in the first bit block being used to determine the first offset value from the first offset value set.

19. The method in the first node according to claim 14, wherein a scheduling signaling of the target PUSCH comprises a first field, where a value of the first field is a non-negative integer; when a number of priorities corresponding to HARQ-ACK bits that the target PUSCH is used to carry is greater than 1, the value of the first field is used to determine a number of HARQ-ACK bit(s) corresponding to low priority that the target PUSCH is used to carry.

20. The method in the first node according to claim 14, wherein the number of HARQ-ACK bit(s) comprised in the first bit block is used to determine an order of the first bit block being multiplexed onto the target PUSCH, the number of bits comprised in the first bit sequence is used to determine a target interval, the target interval being a positive integer, and the target interval being used to determine a distribution of the bits comprised in the first bit sequence in the target bit sequence.

* * * * *